US010854186B1

(12) United States Patent
Devireddy et al.

(10) Patent No.: US 10,854,186 B1
(45) Date of Patent: Dec. 1, 2020

(54) PROCESSING AUDIO DATA RECEIVED FROM LOCAL DEVICES

(71) Applicant: Amazon Technologies, Inc., Seattle, WA (US)

(72) Inventors: Sanjay Devireddy, Seattle, WA (US); Kenneth Edward Cecka, Bainbridge Island, WA (US); Adam Stevens, Maple Valley, WA (US); Sebastian Pierce-Durance, Seattle, WA (US); Naveen Kumar Devaraj, Bellevue, WA (US); Po-Chen Paul Yang, Seattle, WA (US); Federico Dan Rozenberg, Seattle, WA (US); Pete Baldridge, Seattle, WA (US); Pranov Rai, Seattle, WA (US); Todd Greenwalt, Kirkland, WA (US); Yusuf Goren, Seattle, WA (US); Rajiv Jain, Moutain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/518,634

(22) Filed: Jul. 22, 2019

(51) Int. Cl.
G10K 11/178 (2006.01)
H04L 29/08 (2006.01)
G06F 3/16 (2006.01)
G10L 15/26 (2006.01)

(52) U.S. Cl.
CPC ............ G10K 11/178 (2013.01); G06F 3/165 (2013.01); H04L 67/12 (2013.01); G10L 15/26 (2013.01)

(58) Field of Classification Search
None
See application file for complete search history.

(56) References Cited

U.S. PATENT DOCUMENTS

| 9,697,828 | B1 * | 7/2017 | Prasad | G10L 15/18 |
| 9,916,840 | B1 * | 3/2018 | Do | H04M 9/082 |
| 2012/0219146 | A1 * | 8/2012 | Mason | H04M 9/082 379/406.01 |
| 2014/0359274 | A1 * | 12/2014 | Kirkup | H04L 9/0844 713/150 |
| 2019/0394338 | A1 * | 12/2019 | Wada | H04B 3/23 |

* cited by examiner

Primary Examiner — James K Mooney
(74) Attorney, Agent, or Firm — Pierce Atwood LLP

(57) ABSTRACT

A device-management system performs audio processing, such as acoustic echo cancellation or beamforming, in a computing-resource allocation corresponding to a functionally limited device. The device-management system may be a locally-connected network device that is in communication with one or more user devices; the device-management system may also or instead be a remote device that communicates with the user devices using the locally-connected network device. The device-management system may receive audio data from one or more microphones of one or more user devices. To perform acoustic echo cancellation, the device-management system may receive and process time data corresponding to a time of output of audio by the user device.

20 Claims, 23 Drawing Sheets

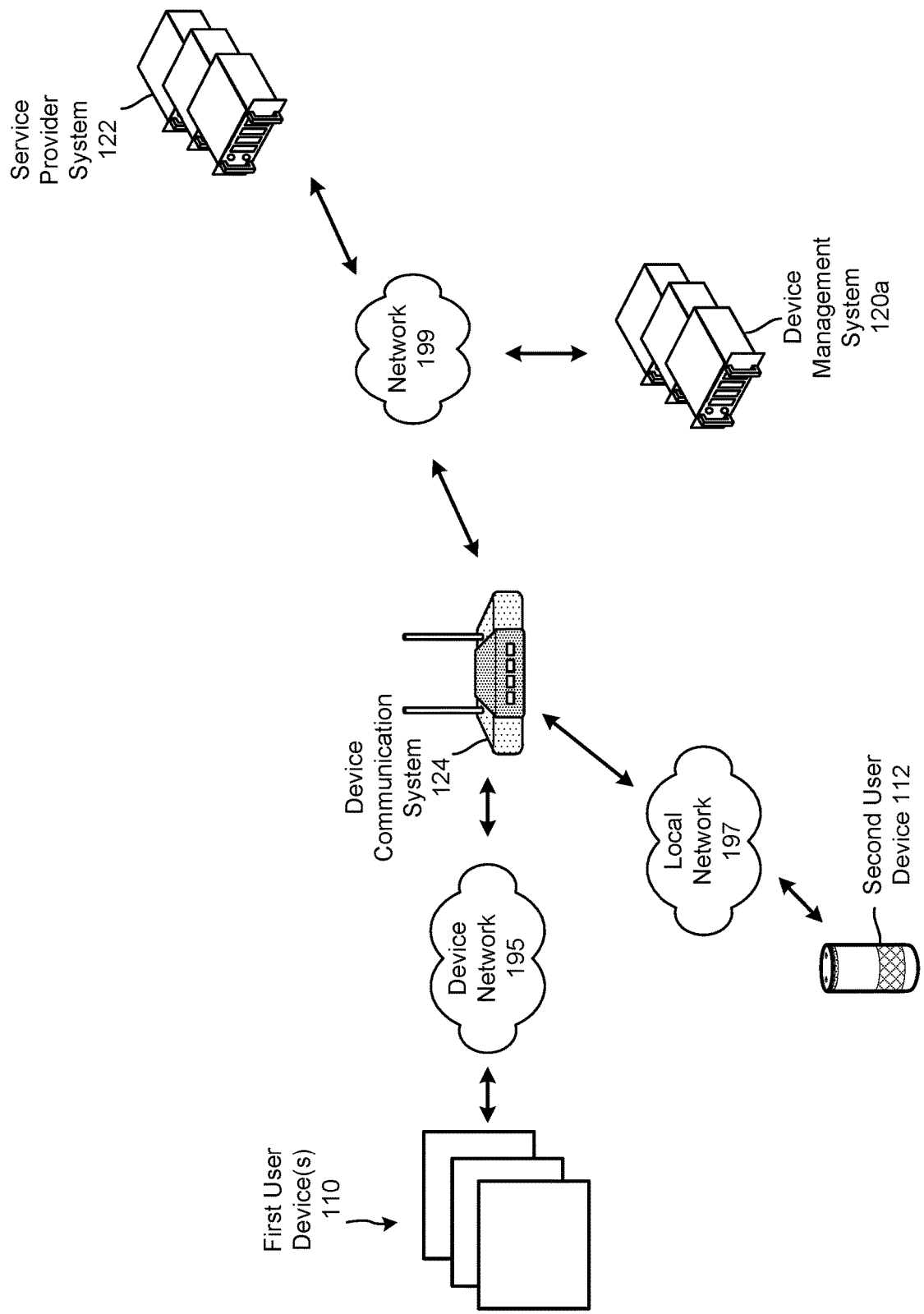

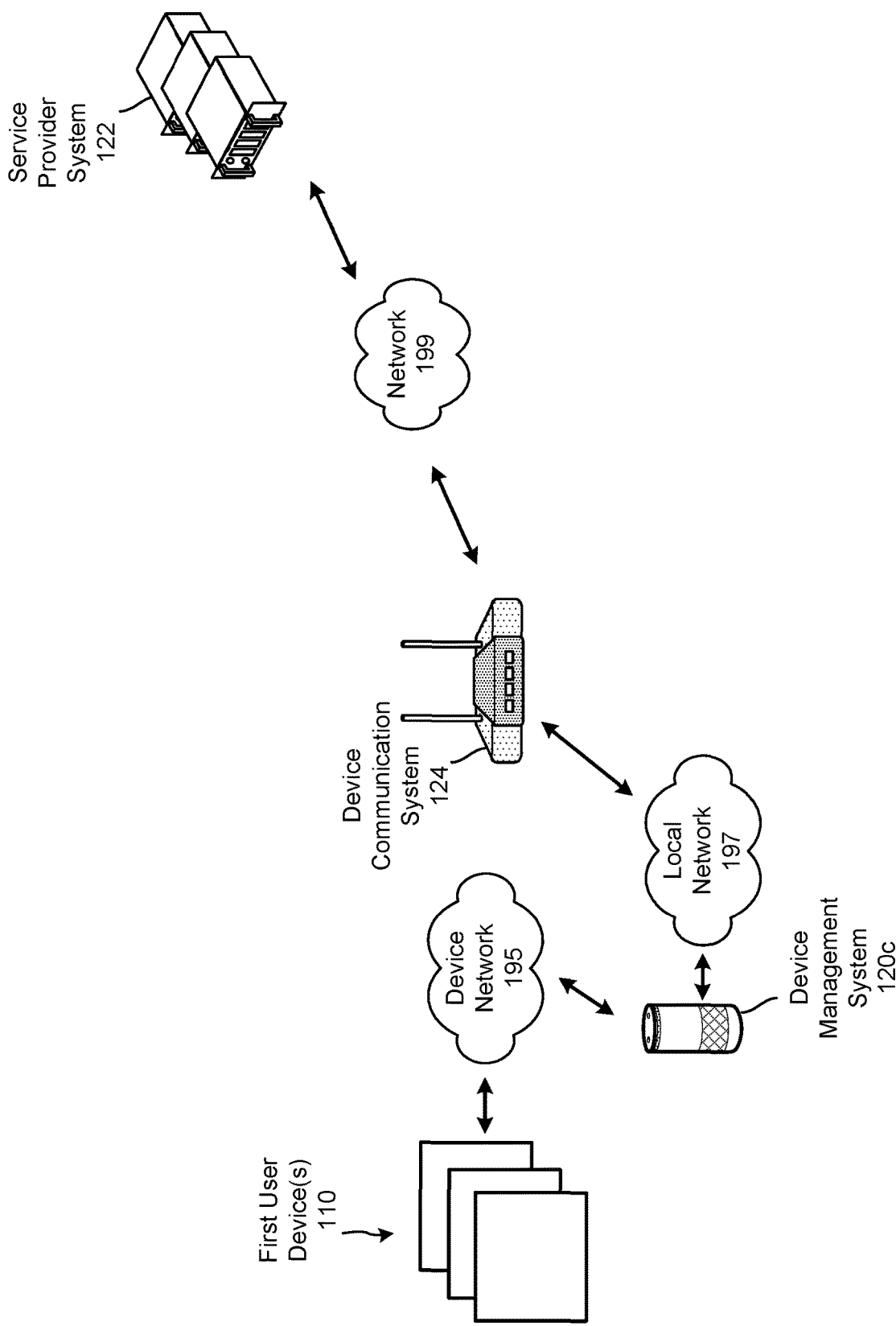

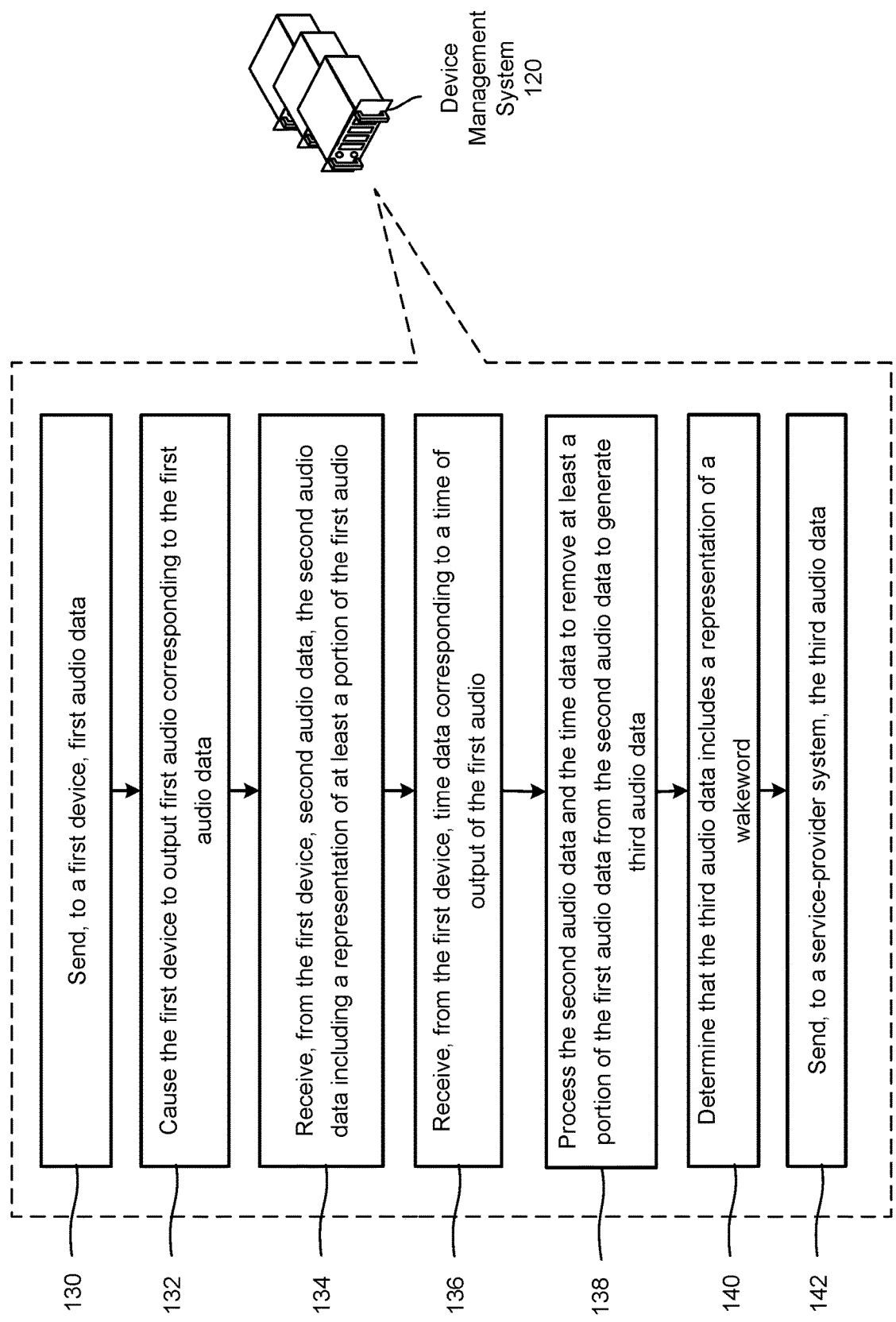

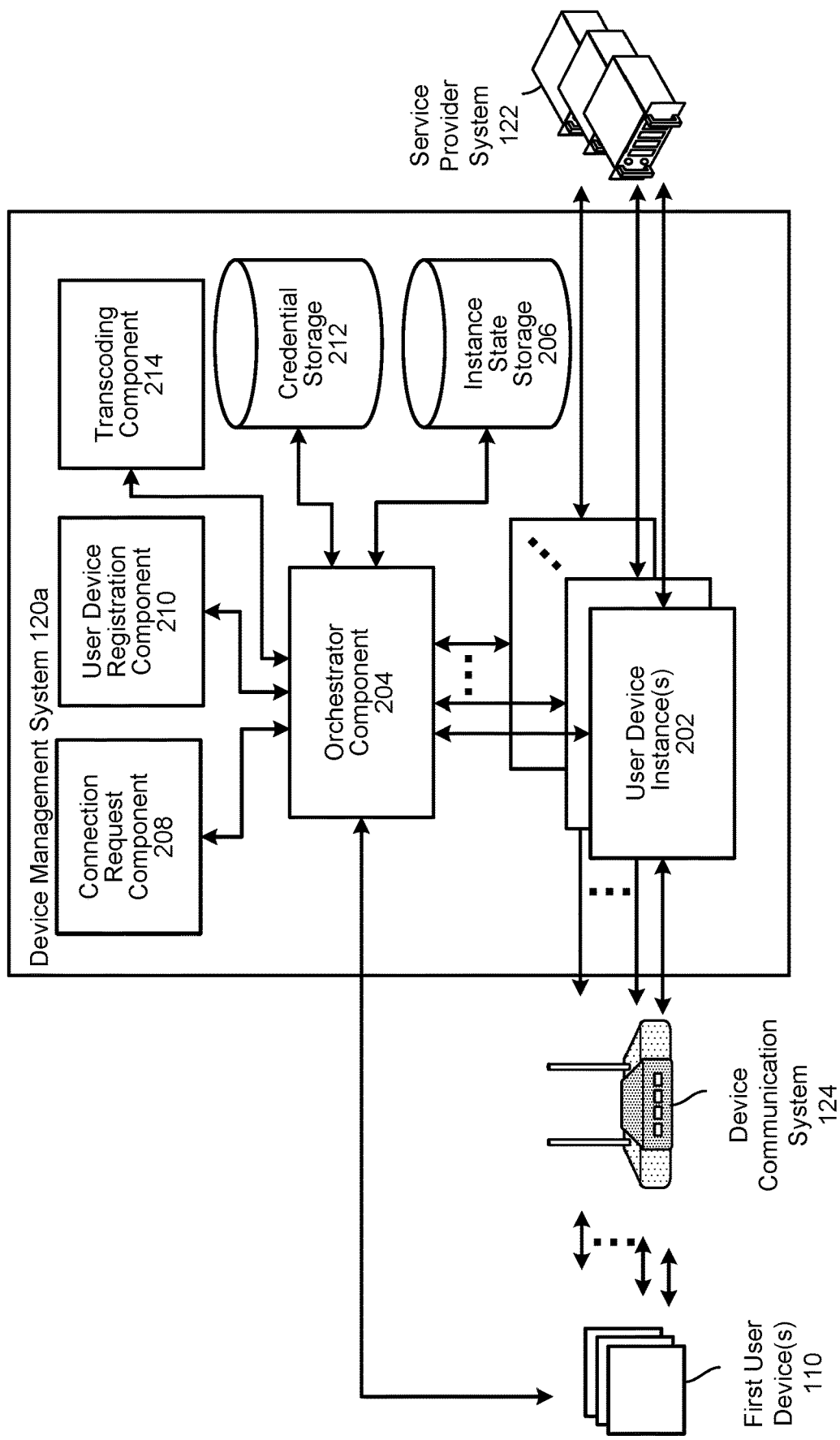

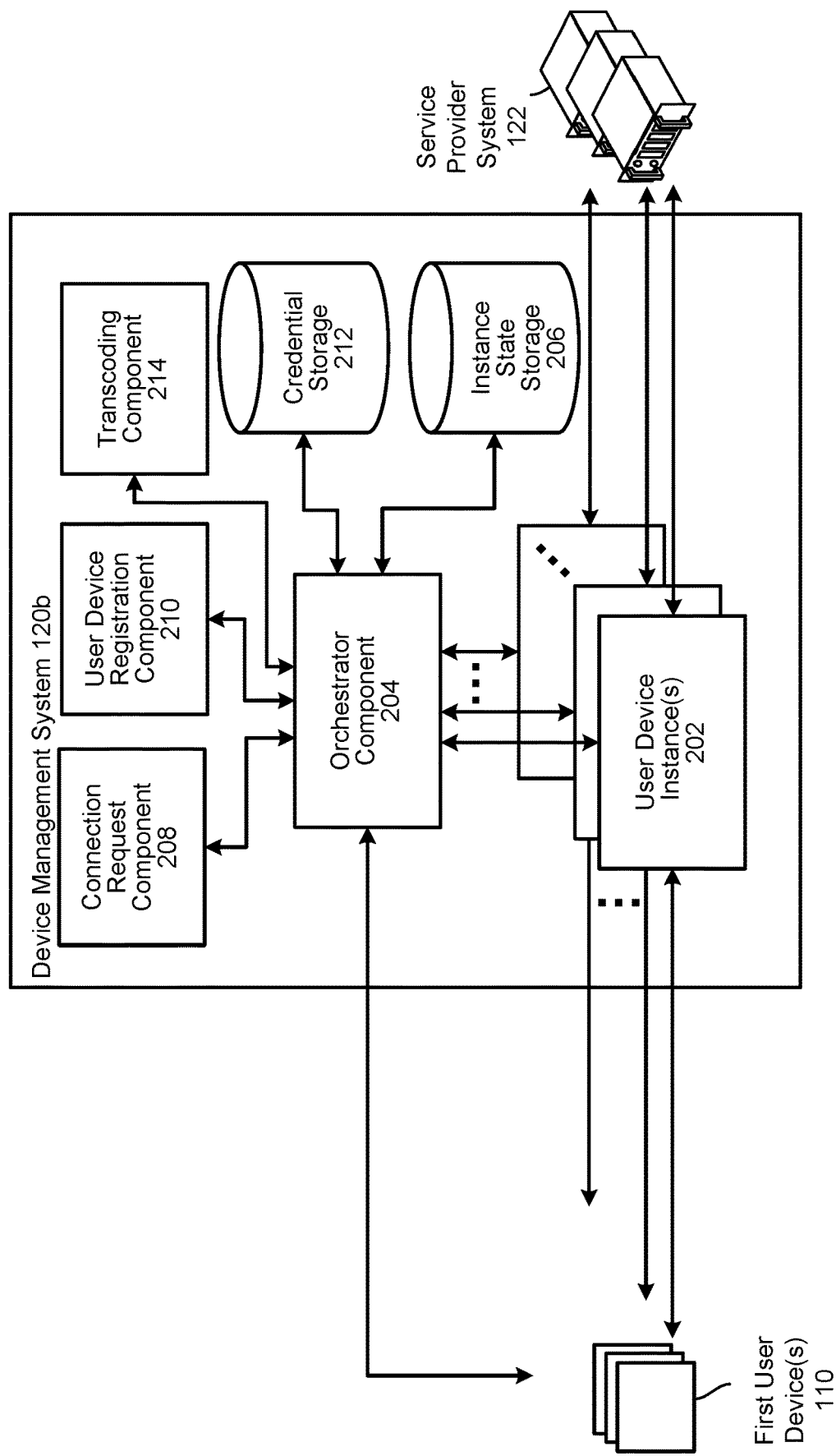

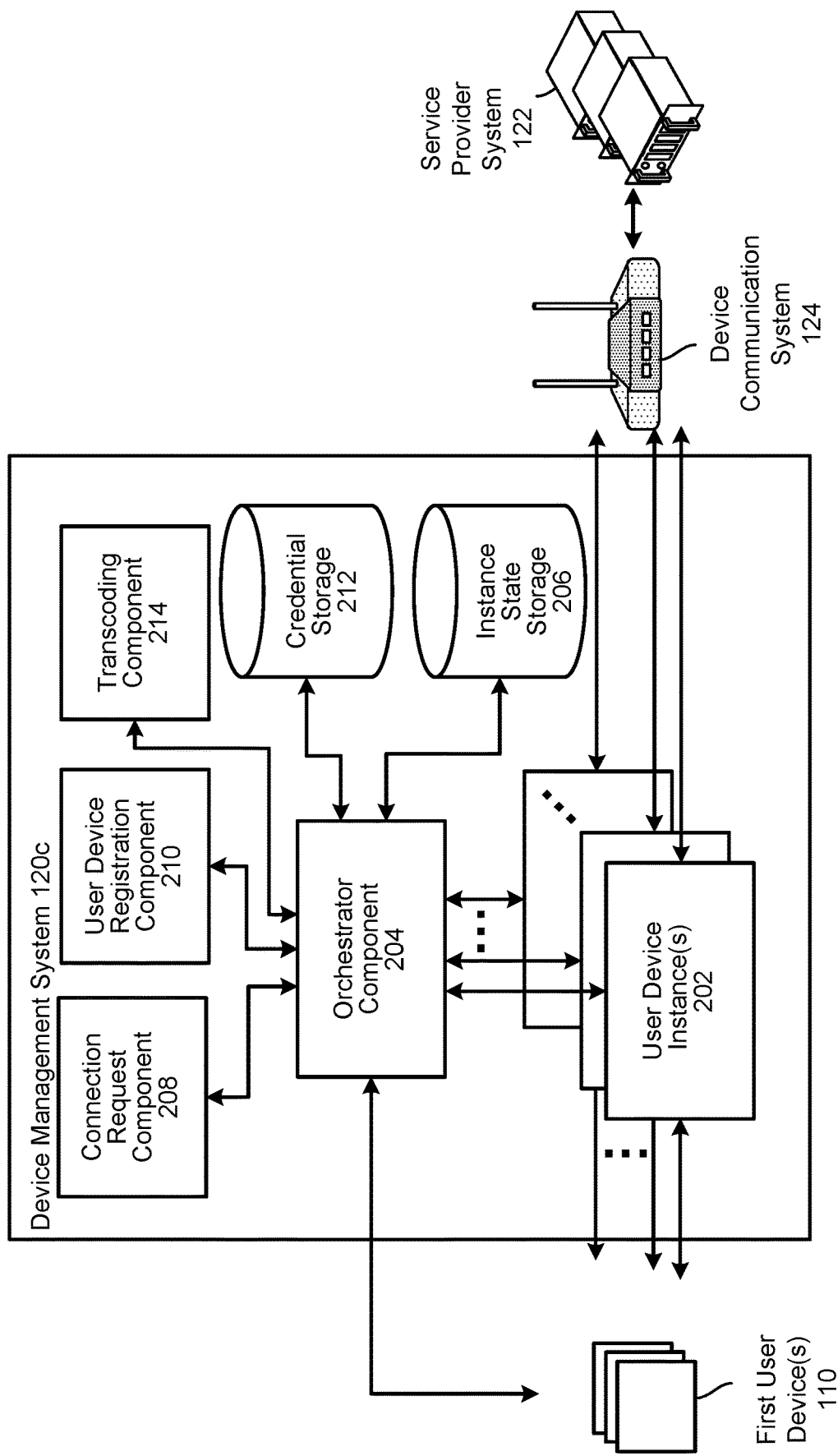

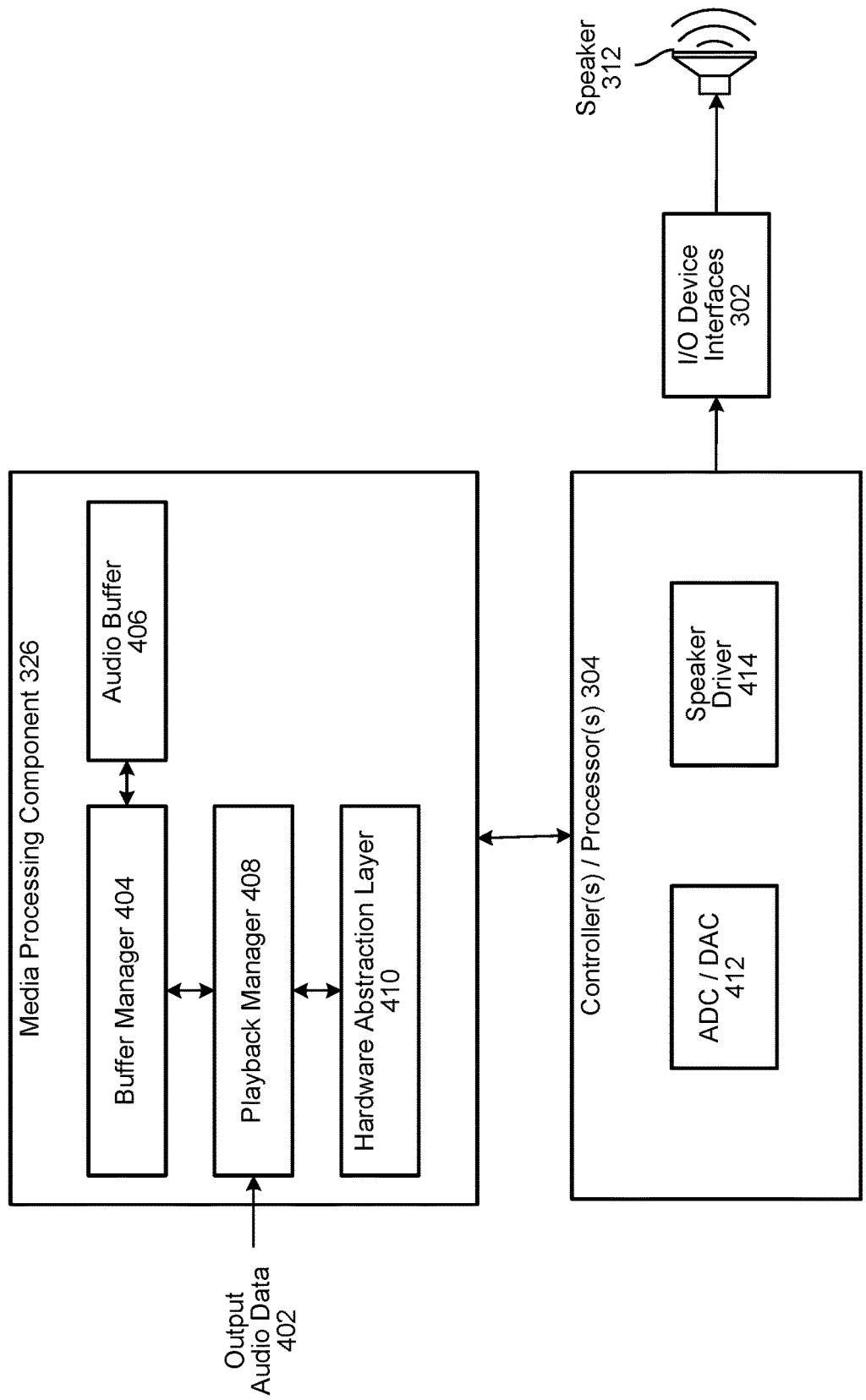

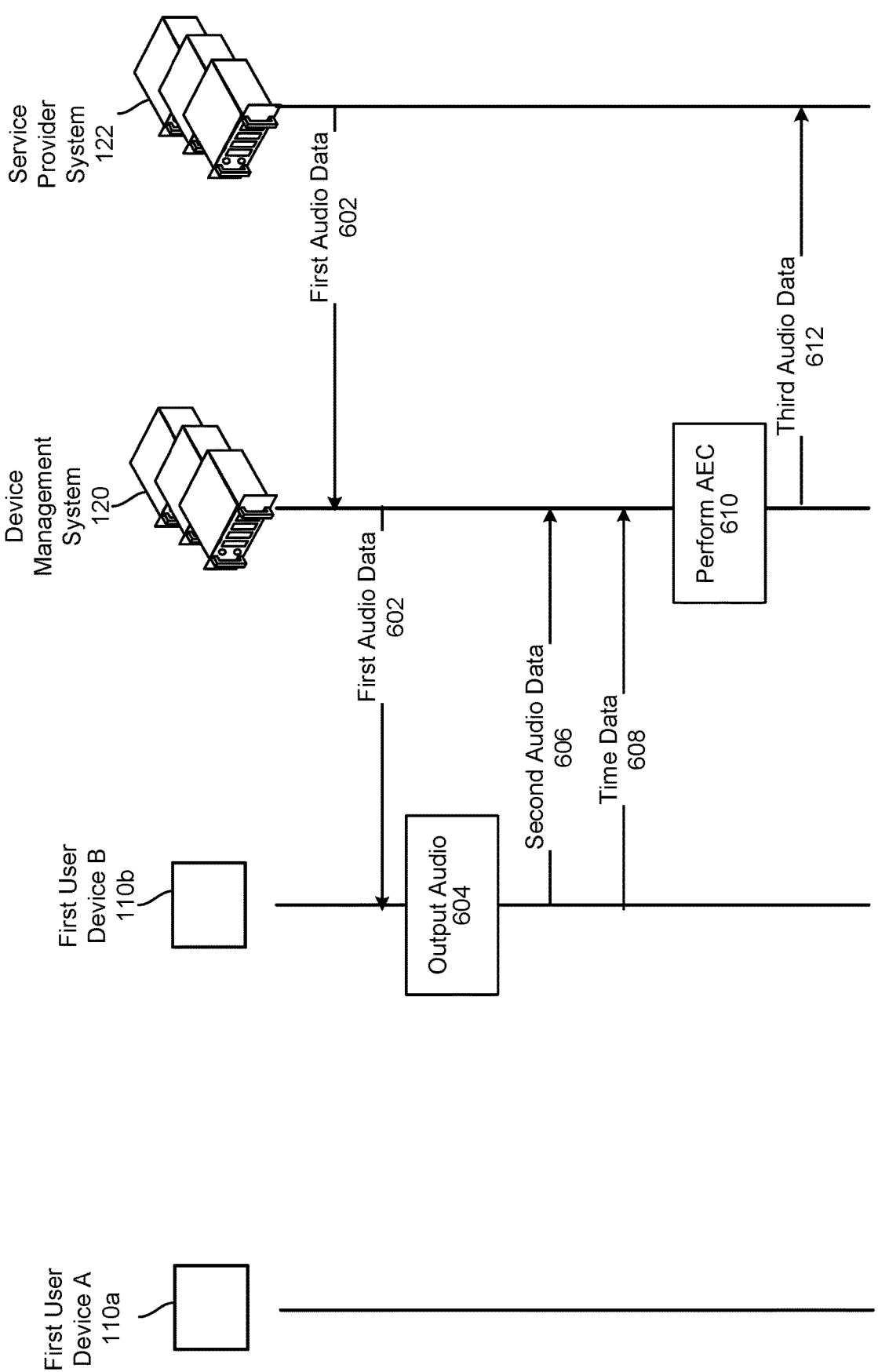

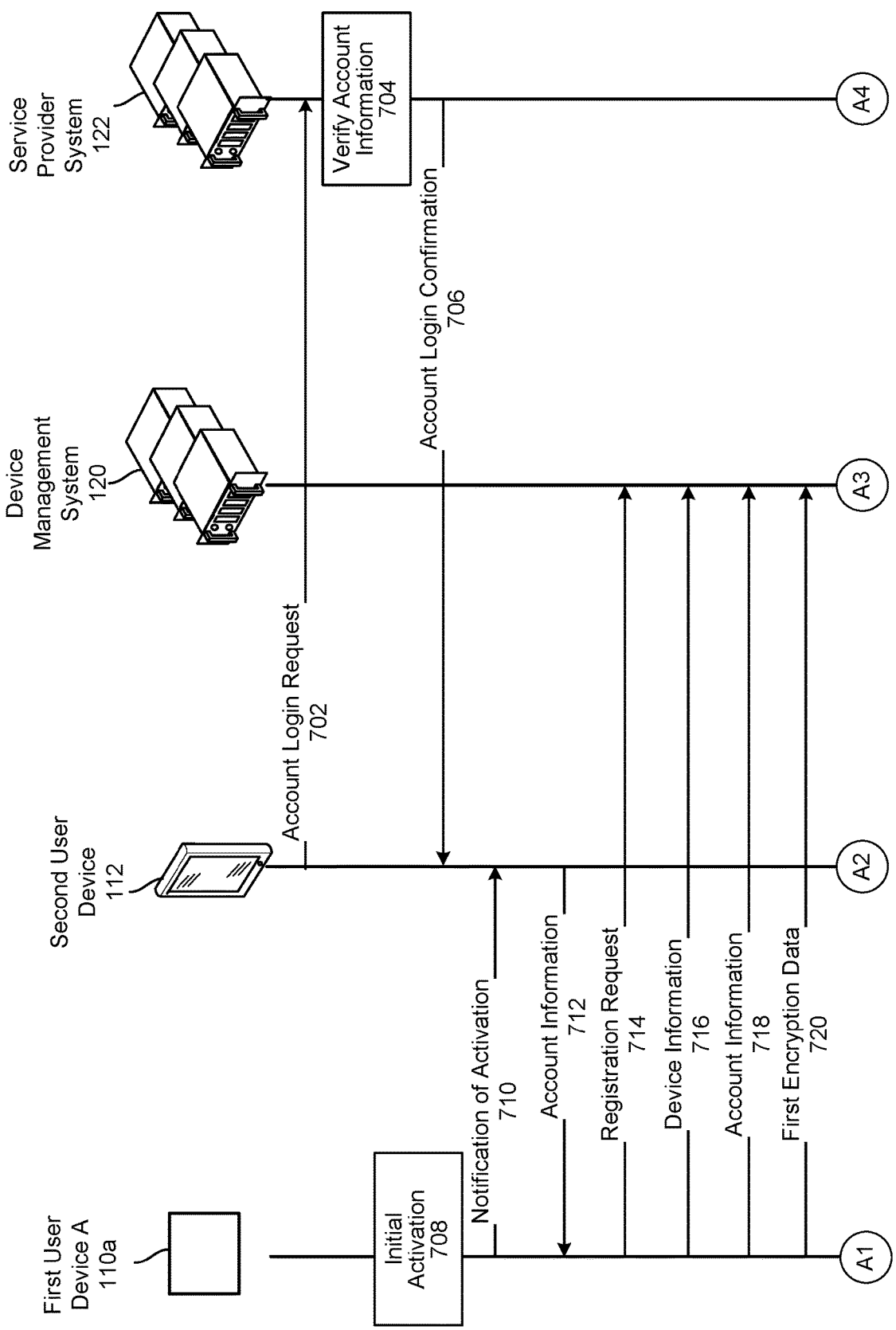

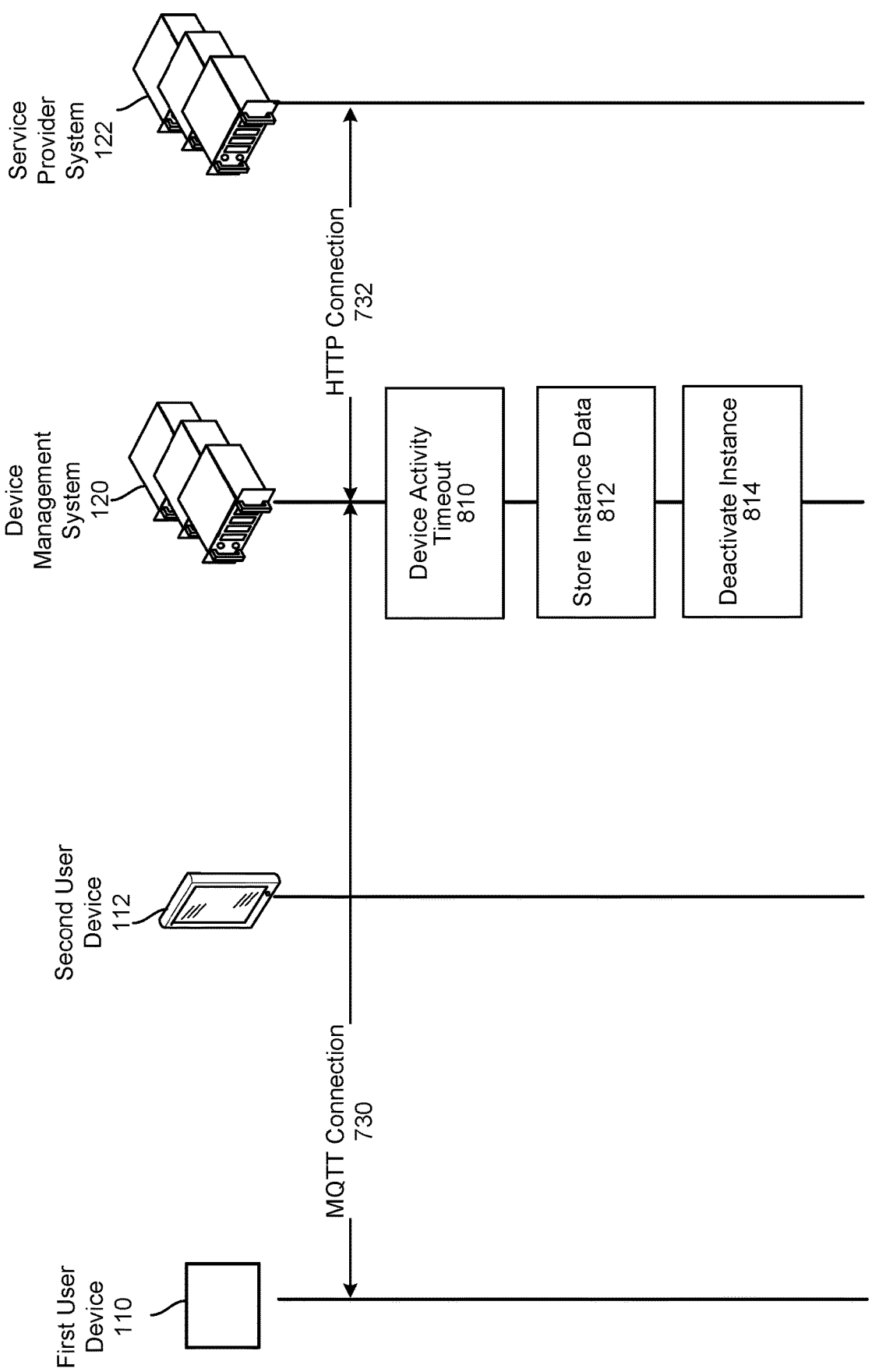

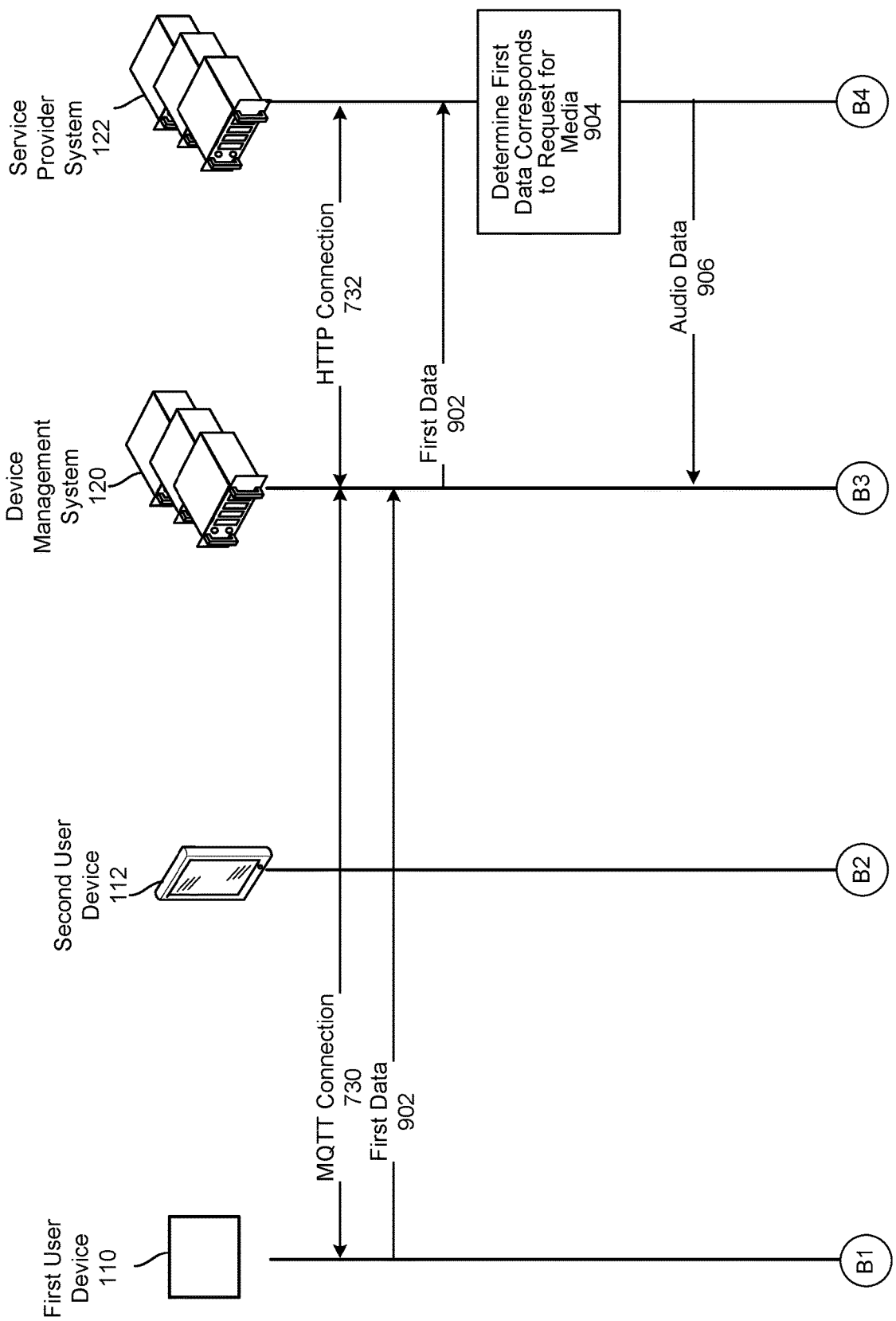

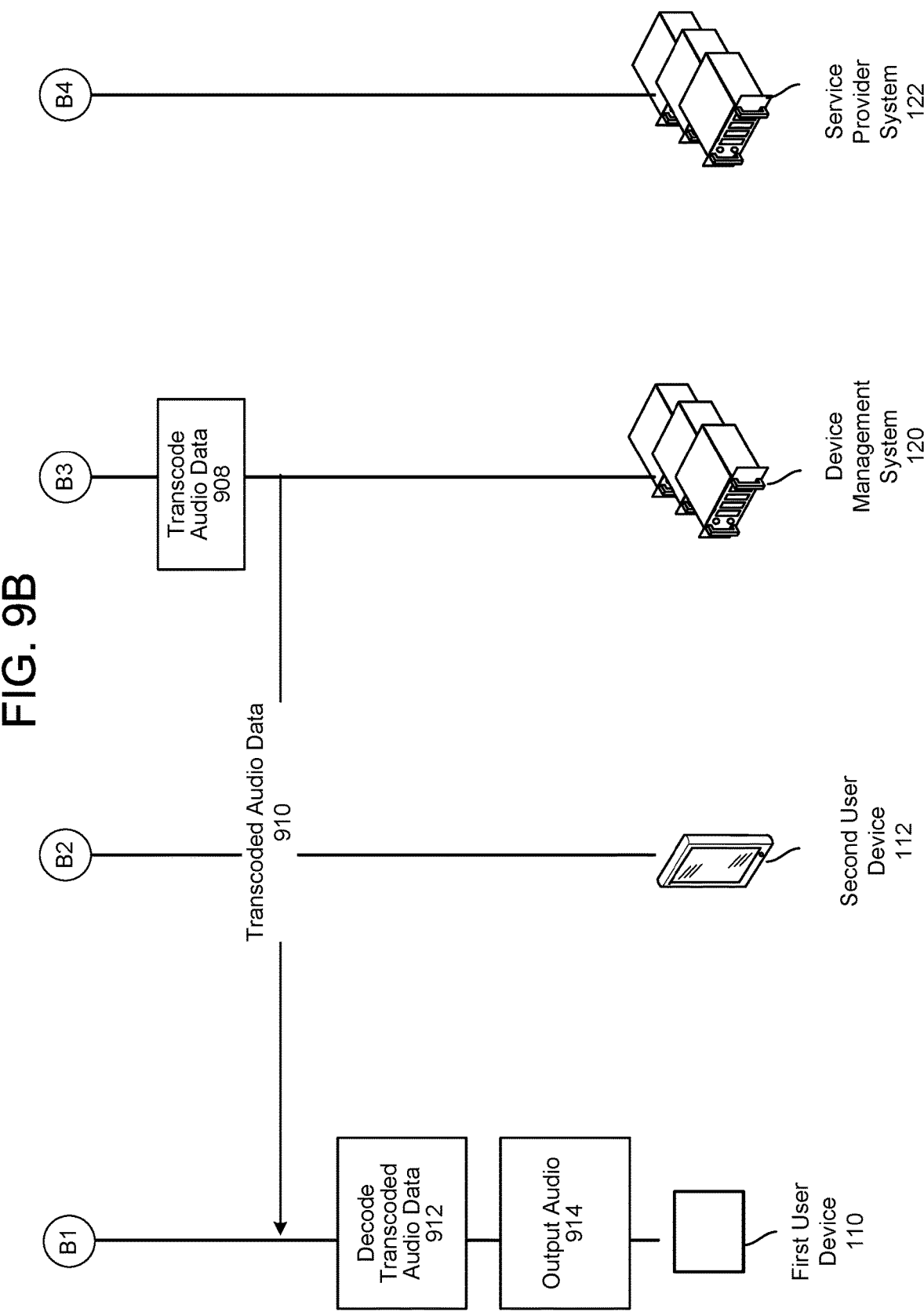

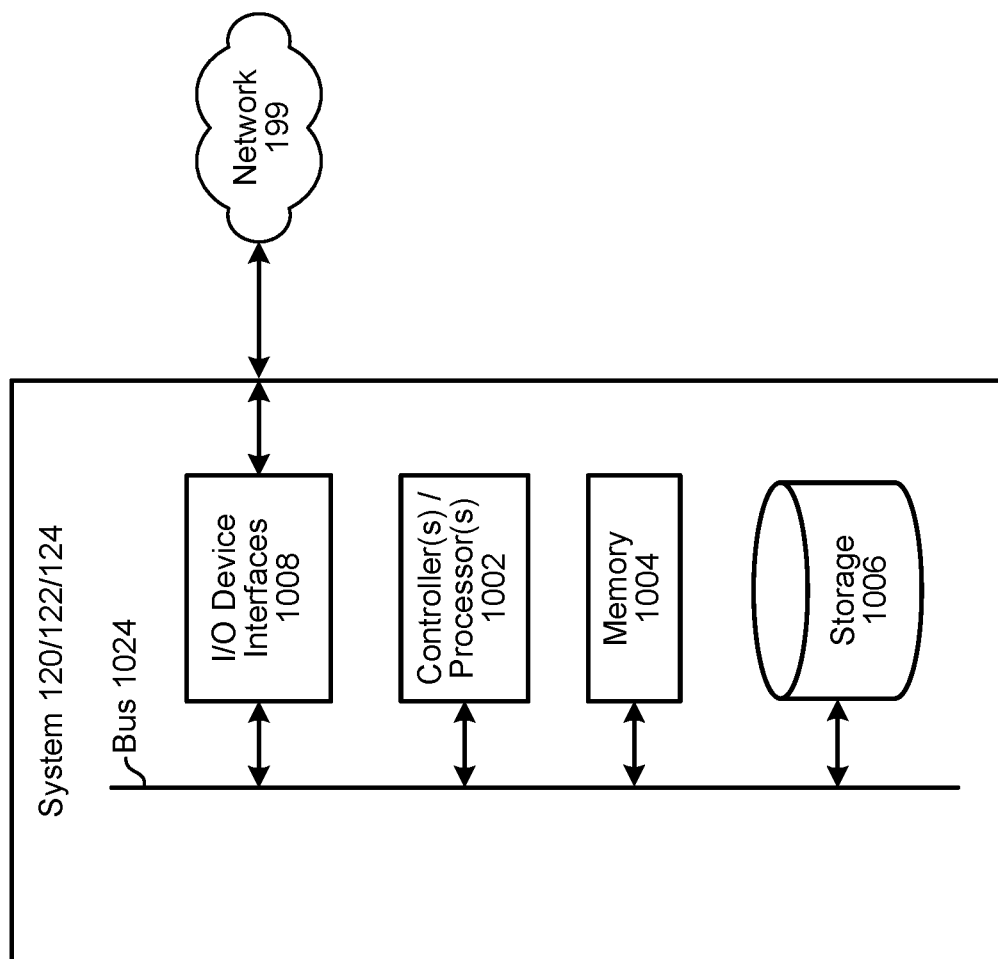

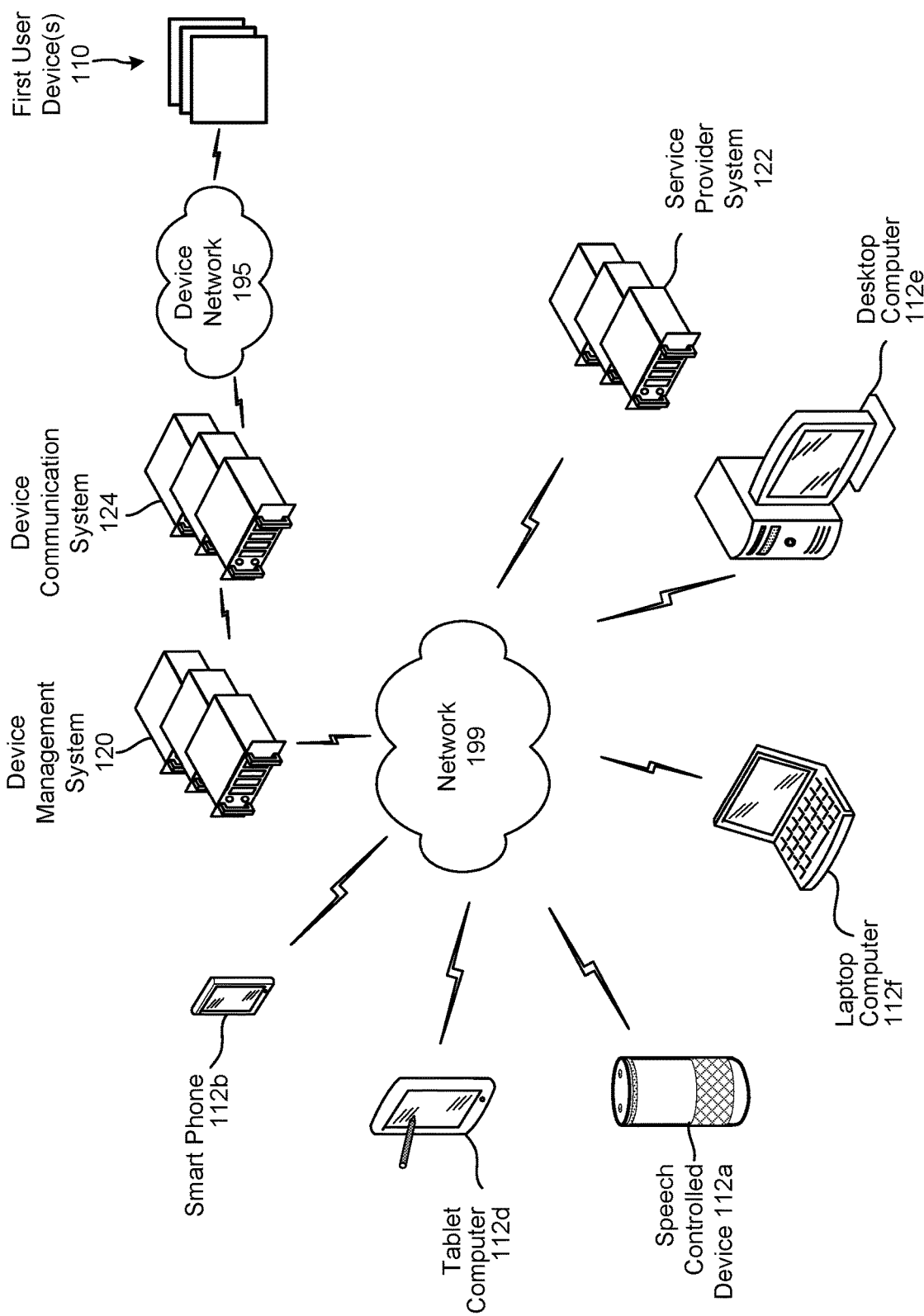

PROCESSING AUDIO DATA RECEIVED FROM LOCAL DEVICES

BACKGROUND

Speech recognition systems have progressed to a point at which humans can interact with computing devices using their voices. Such systems employ techniques to identify the words spoken by a human user based on the various characteristics of a received audio input. Speech recognition, combined with natural-language understanding processing techniques, enables speech-based user control of a computing device to perform tasks based on the user's spoken commands. The combination of speech recognition and natural-language understanding processing techniques is referred to herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1C illustrate systems for managing user devices in accordance with embodiments of the present disclosure.

FIG. 1D illustrates a method for managing instances of virtual machines in accordance with embodiments of the present disclosure.

FIGS. 2A-2C illustrate components of systems for managing user devices in accordance with embodiments of the present disclosure.

FIGS. 4A-4D illustrate audio-processing components of user devices in accordance with embodiments of the present disclosure.

FIGS. 6A and 6B illustrates steps of methods for processing audio received from a user device in accordance with embodiments of the present disclosure.

FIGS. 7A and 7B illustrate steps of a method for registering a user device in accordance with embodiments of the present disclosure.

FIGS. 8A and 8B illustrate steps of methods for activating and de-activating an instance in accordance with embodiments of the present disclosure.

FIGS. 9A and 9B illustrate steps of a method for transcoding data in accordance with embodiments of the present disclosure.

FIG. 10 illustrates components of a system in accordance with embodiments of the present disclosure.

FIG. 11 illustrates a computer network for use with embodiments of the present disclosure.

DETAILED DESCRIPTION

Figure 1B:
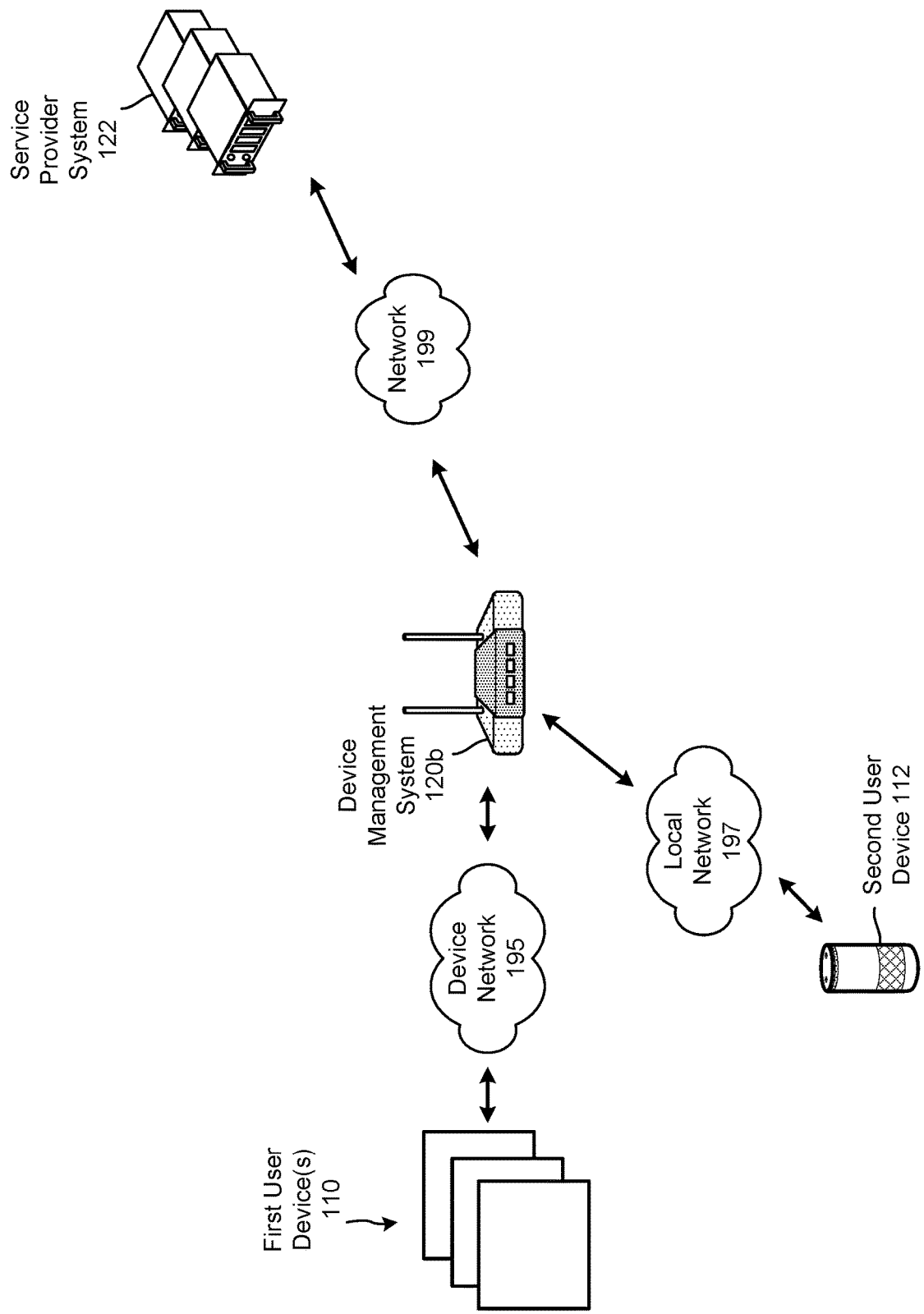

Computing devices may be used to perform a variety of tasks, such as outputting audio and/or video or conducting a voice or video call. The devices may further feature a voice-based interface that allows a user to interact with the device using speech. The devices may include a computer processor, computer memory, and storage capable of storing and processing computer instructions to accomplish some or all of these tasks.

In various embodiments, a device-management system assists user devices in performing tasks by performing some or all of the processing that would otherwise be performed by the user device. In order to assist the user devices in performing the tasks, a user device communication system may be used to communicate with the user devices and to perform processing, such as processing of audio data, on behalf of the user devices. For example, the user devices may not be capable of performing acoustic processing, such as acoustic echo cancellation (AEC), acoustic echo suppression (AES), and/or beamforming. The user devices may therefore send audio data from one or more microphones to a device management system to perform this processing. The device-management system may perform the AEC processing based at least in part on time data received from the user device; this time data may indicate a time of output of audio. The device-management system may further perform beamforming processing, as described in greater detail below, using audio data received from two or more microphones of one or more user devices.

The device-management system may determine one or more computing-resource allocations, as described in greater detail below, for the one or more user devices, and may execute the allocations to perform the local-device processing. For example, the allocation may receive audio data from the user device and process the audio data to, for example, remove and/or suppress echoes in the audio data and/or determine directional information corresponding to the audio data (e.g., perform beamforming). The allocation may process the received audio data for other functions, such as for voice-activity detection, event detection, wakeword detection, or other such processing.

A subset of these user devices may be functionally limited devices; while they may include a computer processor, computer memory, and/or storage, these components are reduced in processing power and size with respect to other, non-functionally limited devices. Due to this reduction, the processing capabilities of the functionally limited devices are thus reduced, and these functionally limited devices may not be capable of processing some or all of the computer instructions necessary to accomplish a given task. The functionally limited devices may include devices that are constrained by their purchase price, deployment location, or intended use; examples include light bulbs and light switches that feature computer circuitry implementing a voice interface. The devices may include merely a microphone, speaker, wireless interface, and circuitry to operate them but may lack, for example, a computer memory of a size sufficient to store and run computer instructions. These devices may be referred to herein as "Internet of Things" ("IoT") devices. A functionally limited device may, for example, assist in performing automatic speech recognition by capturing audio data and sending the audio data to a remote system, which may determine if the audio data includes a representation of an utterance.

Automatic speech recognition (ASR) is a field of computer science, artificial intelligence, and linguistics involving transforming audio data associated with speech into text representative of that speech. Natural language understanding (NLU) is a field of computer science, artificial intelligence, and linguistics concerned with enabling computers to derive meaning from input data representing natural language (e.g., text data and/or audio data). ASR and NLU are often used together as part of a speech processing system.

In some embodiments, a user device having one or more microphones is configured to capture speech from a user and convert those sounds into an audio signal. A distributed computing system may be used to perform the speech processing. An example distributed system may involve the user device and a remote device; the user device may send the audio signal to the remote device, which then performs the speech processing. A command corresponding to the speech processing may then be executed by a combination of remote and user devices.

A user device and/or other components of the system may be configured to activate upon a user speaking a particular word—referred to herein as a "wakeword"—to activate functionality of the user device (e.g., send and/or process audio data) in expectation of the user speaking a further command directed to the system. Some components, such as a voice-activity detection (VAD) component (discussed in greater detail below) may continually listen for speech; upon detection of speech, the VAD component may activate other components, such as a wakeword-detection component. The wakeword may include an indication for the system to perform further processing. For example, a system may be configured to detect a wakeword and then process any subsequent audio following the wakeword (and, in some embodiments, some amount of pre-wakeword audio) to detect any commands in the subsequent audio. As an example, a wakeword may include a name by which a user refers to a device. Thus, if the wakeword is "Alexa," a user may command a local voice-controlled device to play music by saying "Alexa, play some music." The user device may continually receive and process audio to detect the wakeword. Upon the user device recognizing the wakeword "Alexa," the user device may process the subsequent audio (in this example, "play some music") to determine a command. Additionally or alternatively, the user device may send audio data corresponding to detected speech to a remote device to perform speech processing on that audio to determine the command for execution. Provided services may include performing actions, rendering media, obtaining and/or providing information, and/or initiating Internet-based services.

Some wakeword-detection systems include neural networks to process audio data. A neural network is a computer program that includes a plurality of nodes that process an input and produce an output in accordance with one or more weights. The neural network may be trained using training data, as described in greater detail below. A wakeword-detection system may use a convolutional neural network (CNN) to process data representing speech. A wakeword-detection system may further include a recurrent neural network (RNN), such as a long short-term memory (LSTM), which bases its output not only on a current input but also past outputs.

The device-management system may be disposed locally with respect to the one or more user devices. That is, if the user devices are disposed in a home, workplace, or factory, the device-management system may also be disposed in the same location. The device-management system may be, for example, a wireless router or switch configured to communicate with the user devices, perform processing for the user devices, and/or send data received from the user devices, such as audio data corresponding to one or more utterances, to a service-provider system for speech processing.

In other embodiments, the device-management system is disposed remote to the user devices. For example, the device-management system may be connected via a network, such as the Internet. In order to communicate with the user devices, a device communication system may be used. The device communication system, which may be also a wireless switch or router, may communicate with the one or more user devices via a first network, such as a Bluetooth network, and may communicate with the service-provider system via a second network, such as the Internet. In these embodiments, the device communication system merely relays messages between the user devices and the device-management system.

In other embodiments, the device-management system is disposed locally to the user devices but on a device other than a device-communication system. The device-communication system may be, as described above, a wireless switch or router that communicates with a remote service-provider system. The device-communication system may, however, be in communication, via a local network such as a WiFi network, with another device that acts as the device-management system. This other device may be any user device, such as a desktop computer, laptop computer, smartphone, tablet computer, smart speaker, or other such device.

In various embodiments, a remote device-management system assists user devices in performing tasks by performing some or all of processing that would otherwise be performed by a user device. The device-management system may determine a computing-resource allocation corresponding to each device. The computing resource allocation may include a computer processor, memory, input/output interface, storage, or other such hardware computing resources. The computing-resource allocation may further include an operating system, device drivers, and software programs. In some embodiments, the computing-resource allocation includes one or more computing processes executing on a server; the computing-resource allocation may instead or in addition include an instance of a virtual machine. An instance of a virtual machine refers to an operating system and/or programs that execute within a protected memory space of a server; to the executing operating system and/or programs, the instance of the virtual machine emulates a set of hardware computing resources.

These hardware and/or software computing resources may be used to execute computing instructions that allow the instance to communicate with the user device. The instance may then further determine an action to be executed using the user device and communicate with a service-provider system, such as a speech-processing system, to execute the action. The memory allocated for one instance may be separated (and unable to communicate with) the memory allocated to a second instance to thereby protect data of a first user device from being accessed by a second user device.

The instance may be used to execute computer instructions that would ordinarily execute on the user device if the user device were capable of said execution. For example, the user device may not have sufficient computing resources to execute instructions corresponding to audio processing (described in greater detail below). The device-management system may therefore communicate with the user device, receive audio data from the user device, and using the audio data, execute (for example) an audio-processing component executing in the instance corresponding to the device.

Instances may be permanently allocated and executed for each user device managed by the device-management system. In some embodiments, an instance is allocated for a user device only when data corresponding to that device is received. A previous state of the instance may be loaded from a computer memory. Instances may be de-allocated after a certain amount of time has passed without receiving data from the user device. This timeout may be, for example, one hour.

The device-management system may communicate with a user device using a particular networking protocol. In some embodiments, this protocol is Bluetooth or WiFi. Any such networking protocol is, however, within the scope of the present disclosure.

The device-management system may further communicate with a service-provider system. The service-provider system may include a speech-processing system for determining commands or requests represented in audio data, speechlets for carrying out the commands or requests, a text-to-speech (TTS) system for generating synthesized speech, a metrics system for tracking device metrics, or other such components.

The device-communication system may be configured during its initial activation to receive encryption data, such as a shared security key. Communication between the user devices and the device-management system, device-communication system, and/or the user device may not be secured in that a third party may be able to intercept and read this communication. Communication, however, between the device-management system, device-communication system, and/or the user device and the service-provider system may be secured using the shared security key. The service-provider system may use this encryption data to encrypt data before sending it to the service-provider system and may use the encryption data to decrypt data after receiving it from the service-provider system. A user device, such as a cellular telephone, computer running a browser, or other device, may be used when registering the device-communication system (e.g., associating it with a user account). For example, a user may provide authentication information (e.g., a username and password) via the user device to the service-provider system, which may in turn provide account information. The user device may then transmit the account information to the device-communication system. The device-communication system may then send the account information, device information, and/or encryption information to the device-management system, which may in turn send this information to the service-provider system to register the device-communication system In some embodiments, the user device includes only a limited number of audio codecs for decoding audio data; this number may be as small as one. The device-management system may determine that the user device has requested receipt of audio data encoded using a codec not implemented by the user device and may therefore transcode the audio data into a codec implemented by the user device. In various embodiments, this codec is called Opus as described in RFCs 6716 and 8251 by the Internet Engineering Task Force (IETF). The device-management system may send and receive data to and from the user device using MQTT's quality of service ("QoS") level 0, in which each data packet is sent at most one time. To ensure delivery of all packets, the device-management system may send data packets of size range 1.5 kB-3.0 kB and may create a delay between adjacent packets; this delay may be 100-200 milliseconds and, in some embodiments, 150 milliseconds. The device-management system may further insert markers in audio data sent to the user device; the user device may send an acknowledgement message to the device-management system when each marker is encountered. These acknowledgement messages may be used by the device-management system to verify that transmitted audio data has been output by the user device.

In some embodiments, the first user device 110 supports only a limited number of network commands. This limiting may allow the first user device 110 to consume less computing resources. The device-management system 120 may thus communicate with the first user device 110 using only a subset of available commands. For example, rather than implementing a dedicated "mute" command to mute audio output of the first user device 110, the device-management system 120 may instead send a "set volume=0" command. Rather than an "unmute" command, the device-management system 120 may send a "set volume=X" command, in which X is the last known volume of the first user device 110.

FIG. 1A illustrates a device-management system 120a in communication with a device-communication system 124, which is further in communication with first user devices 110, such as a light bulb 110a, a light switch 110b, and an alarm bell 110c, and further in communication with a service-provider system 122. The device-management system 120 communicates with the first user devices 110 via the device-communication system 124 and a user device network 195, such as one or more Bluetooth network(s), and communicates with the service-provider system 122 using a second network 199, such as the Internet. A second user device 112, such as a smartphone, is further in communication with the service-provider system 122 via the network 199; this communication may first pass through the device communication system 124 via a local network 197, such as a WiFi network.

In FIG. 1B, a device-management system 120b is disposed locally with respect to the one or more first user devices 110 and communicates directly with the service-provider system 122 (e.g., a separate device-management system, such as the device-management system 120a of FIG. 1A, is not required). The device-management system 120b may be, for example, a wireless router or switch. The device-management system 120b may further communicate with a second user device 112 via a local network 197, which may be, for example, a computer, smartphone, or smart speaker.

In FIG. 1C, a device-management system 120c is also disposed locally to the one or more user devices 120, but is disposed on a device other than the wireless router or switch 120b (as described above with reference to FIG. 1B). In these embodiments, the device-management system 120c may be, for example, a desktop computer, laptop computer, smartphone, smart speaker, or other such device. The device-management system 120c may communicate with the user devices 110 via the device network 195 and may communicate with the service-provider system 122 via local network 197 and the device-communication system 124.

In some embodiments, with reference to FIG. 1D, the device-management system sends (130), to a first device, first audio data. The device-management system causes (132) the first device to output first audio corresponding to the first audio data. The device-management system receives (134), from the first device, second audio data, the second audio data including a representation of at least a portion of the first audio. The device-management system receives (136), from the first device, time data corresponding to a time of output of the first audio. The device-management system processes (138) the second audio data and the time data to remove at least a portion of the first audio data from the second audio data to generate third audio data. The device-management system determines (140) that the third audio data includes a representation of a wakeword. The device-management system sends (142), to a service-provider system, the third audio data.

FIGS. 2A-2C are block diagrams illustrating further details of the device-management system 120. In some embodiments, the device-management system 120 communicates directly with a first user device 110 using a user device network, such as a Bluetooth network. In other embodiments, the device-management system 120 communicates with the first user device 110 via a device-communication system 124. The device-communication system 124 may simply pass through data it receives from the device-management system 120 and/or first user device 110.

As mentioned above, an instance 202 may be created for each first user device 110. The instance 202 may include an allocation of computer memory and one or more computer processors. The computer memory may include instructions corresponding to software applications, operating systems, and/or device drivers. The instructions may allow the execution of user commands not otherwise possible using the first user device 110 alone.

Different user devices 110 may have different levels of computational resources. Depending on this level, different amounts of execution may be performed by the instances 202. If a user device has a low level of computational resources (e.g., it has a slow processor and little memory), its corresponding instance 202 may perform all or nearly all of the processing related to a given user command. For example, the first user device 110 may merely capture audio using a microphone, convert this audio to audio data using a digital-signal processor (DSP), and send the audio data to the instance 202. The corresponding instance 202 may then perform VAD, wakeword detection, or other such processing of the audio data.

In other embodiments, the first user device 110 performs a greater portion of this processing. For example, the first user device 110 may perform VAD and wakeword detection on the audio data before sending the audio data to the instance 202. In some embodiments, the processing is split between the first user device 110 and the instance 202; for example, the first user device 110 may perform VAD and send the audio data to the instance 202 when voice is detected in the audio data. The instance 202 may then, upon receipt of the audio data, perform wakeword detection.

An orchestrator component 204 may manage the instances 202 and other components of the device-management system 120 (discussed further below). The orchestrator component 204 may receive and send commands and/or data between the components in response to inputs received from the user devices 110, service-provider system 122, and/or device-communication system 124. For example, the orchestrator component 204 may allocate an instance 202 when input is received from a first user device 110.

The orchestrator component 204 may store information corresponding to the first user device 110 in an instance state storage 206, which may be a non-volatile computer memory. The instance state storage 206 may store information such as a type of the first user device 110, a state of the first user device 110, a user of the first user device 110, an account associated with the first user device 110, a physical location of the first user device 110, or other such information. The orchestrator component 204 may, when data is received from a first user device 110, identify the first user device 110 using information in the received data, such as a serial number or other identification number. The instance state storage 206 may be indexed using this identification number; the orchestrator component 204 may thus receive, using the identification number, data corresponding to a last known state of the first user device 110 from the instance state storage 206. The orchestrator component 204 may thus initialize the instance 202 using this data.

The orchestrator component 204 may also de-allocate an instance 202 when it detects inactivity of the first user device 110. When the instance 202 is de-allocated, the orchestrator component 204 may store status information corresponding to a current state of the first user device 110 in the instance state storage 206. The orchestrator component 204 may de-allocate the instance 202 when no data is received from the first user device 110 for a period of time and/or when data received from the first user device 110 does not include a representation of an utterance or a wakeword for the period of time. This period of time may be, for example, thirty minutes, one hour, or two hours. The period of time may be fixed or may change depending on one or more factors. For example, the period of time may be longer (for example, two hours) during times that a user is more likely to interact with the user device, such as during daytime or during working hours. The period of time may be shorter (for example, one hour) during times that a user is less likely to interact with the user device, such as during nighttime.

The period of time may further vary based on an amount of storage available in a computer memory configured to store the instances 202 and may be different for different user devices 110. If, for example, the computer memory is less than half (or some other amount) full (e.g., a number of instances 202 in the computer memory consumes less than half of the available storage of the computer memory), the period of time may be longer (e.g., two hours) or may be infinite (e.g., the orchestrator component 204 will not de-allocate an instance 202 no matter how long a corresponding first user device 110 is inactive). The amount of available storage is less than half (or some other amount), however, the period of time may be shorter (e.g., thirty minutes or one hour). If the amount of available storage is less than a threshold (e.g., ten percent), the orchestrator component 204 may de-allocate one or more instances having one or more greatest periods of inactivity.

The orchestrator component 204 may further vary the period of time based on an amount of time between de-allocation of an instance 202 and a time of receipt of next data from the corresponding first user device 110. If, for example, this time difference is less than a threshold (e.g., five or ten minutes), the orchestrator component 204 may increase the period of time for that device 110. The orchestrator component 204 may further increase the period of time even more if data is received from a first user device 110 repeatedly soon after de-allocating the corresponding instance 202. For example, the period of time may be one hour, but a user may happen to interact with the first user device 110 once every 65 minutes; the orchestrator component 204 would thus de-allocate the instance 202 just before the user interacts with the corresponding first user device 110. The user may thus needlessly experience delay in interacting with the first user device 110 due to latency in allocating the instance 202. By detecting this situation and increasing the period of time correspondingly, the orchestrator component 204 may thus prevent this delay and improve the experience of the user.

A connection-request component 208 may monitor a network connection used by one or more user devices 110 to determine when and if a user has interacted with a first user device 110. The connection-request component 208 may determine that the user has interacted with the first user device 110 when data is received from the first user device 110. As mentioned above, the first user device 110 may include identification information in the data that it sends to the device-management system 120. The connection-request component 208 may identify the first user device 110 using this identification information and may send the identity of the first user device 110 to the orchestrator component 204, which may then, as described above, allocate a corresponding instance 202.

As also explained below, initialization of a first user device 110 may include additional components and processes. Initialization of the first user device 110 refers to the process in which a first user device 110 is first turned on or after a device reset and includes associating the first user device 110 with a user account and/or providing encryption data to the first user device 110. A user device registration component 210 may determine that, when data is received from a first user device 110, the device 110 is not registered with the device-management system 120 and/or service-provider system 122. The user device registration component 210 may make this determination by determining that information identifying the device 110 is not present in a credential storage 212. The user device registration component 210 may, for example, determine device-identification information in the data received from the first user device 110, use the device-identification information to index a reference in the credential storage 212, and then determine that the reference indicates that the device 110 is not registered (e.g., the reference does not exist or is blank).

The user device registration component 210 may thus send an indication, to a second user device 112, to register the first user device 110. The second user device 112 may be a smartphone, computer, or other such electronic device. The second user device 112 may execute a registration application in a web browser or as a stand-alone application. A user of the second user device 112 may be prompted to install the application and/or visit a web site.

Using the registration application, the user of the second user device 112 may input a username and password associated with the service-provider system 122. The service-provider system 122 may verify that the username and password match a stored username and password associated with a user account. If the user account does not exist, the service-provider system 122 may, using the second user device 112, prompt the user to create one. The service-provider system 122 may then send, to the second user device 112, account information such as a unique serial number associated with the user account.

When the first user device 110 initially powers on and/or is reset, it may send a request to the second user device 112 for the account information. If the second user device 112 already has the account information, it may then send it to the first user device 110. If not, the second user device 112 may acquire the account information as described above.

The first user device 110 may then send a registration request to the user device registration component 210. The registration request may include the account information. The registration request may further include device-identification information, such as a unique serial number or MAC address, that identifies the user device. The registration request may further include encryption data, such as a public key associated with the first user device 110. The user device registration component 210 may send some or all of this information to the service-provider system 122. The service-provider system 122 may use the public key of the first user device 110 and further encryption data, such as its own private key, to create shared encryption data. The service-provider system 122 may then send the shared encryption data to the device-management system 120, which may in turn send it to the first user device 110. The first user device 110 may thereafter use this shared encryption data to encrypt data before sending it to the device-management system 120 and to decrypt data received from the device-management system 120. The device-management system 120 and/or service-provider system 122 may similarly use the shared encryption data to encrypt and decrypt data for sending and receiving to the first user device 110.

A transcoding component 214 may be used to transcode audio data. As mentioned above, the first user device 110 may have only a limited number of on-board audio codecs available to decode received audio data prior to outputting corresponding audio. The first user device 110 may have only a single codec, such as the Opus codec. While having one or just a few codecs means that the first user device 110 may require fewer computing resources, such as storage or memory, it also means that the first user device 110 is unable to decode any audio data not encoded using its available codec or codecs.

The transcoding component 214 may process audio data received from the service-provider system 122 and/or other providers of audio data, such as music streaming services. The transcoding component 214 may determine which codec was used to encode the audio data by, for example, determining the source of the audio data and/or by examining metadata associated with the audio data. For example, the audio data may include a header that lists the source of the audio data and/or the codec used. The transcoding component 214 may instead or in addition determine the codec based on a request received from the first user device 110 based at least in part on a media source identified in the request.

The transcoding component 214 may then determine whether the determined audio codec is supported by the first user device 110. The transcoding component 214 may, for example, compare the determined audio codec with a list of audio codecs known to be supported by the first user device 110.

If the determined audio codec is not supported by the first user device 110, the transcoding component 214 may transcode the audio data such that it is encoded by an audio codec that is supported by the first user device 110. The transcoding may be performed by decoding the audio data using the first, determined codec and then encoding the resulting decoded audio data using the second, supported codec.

Figure 3:
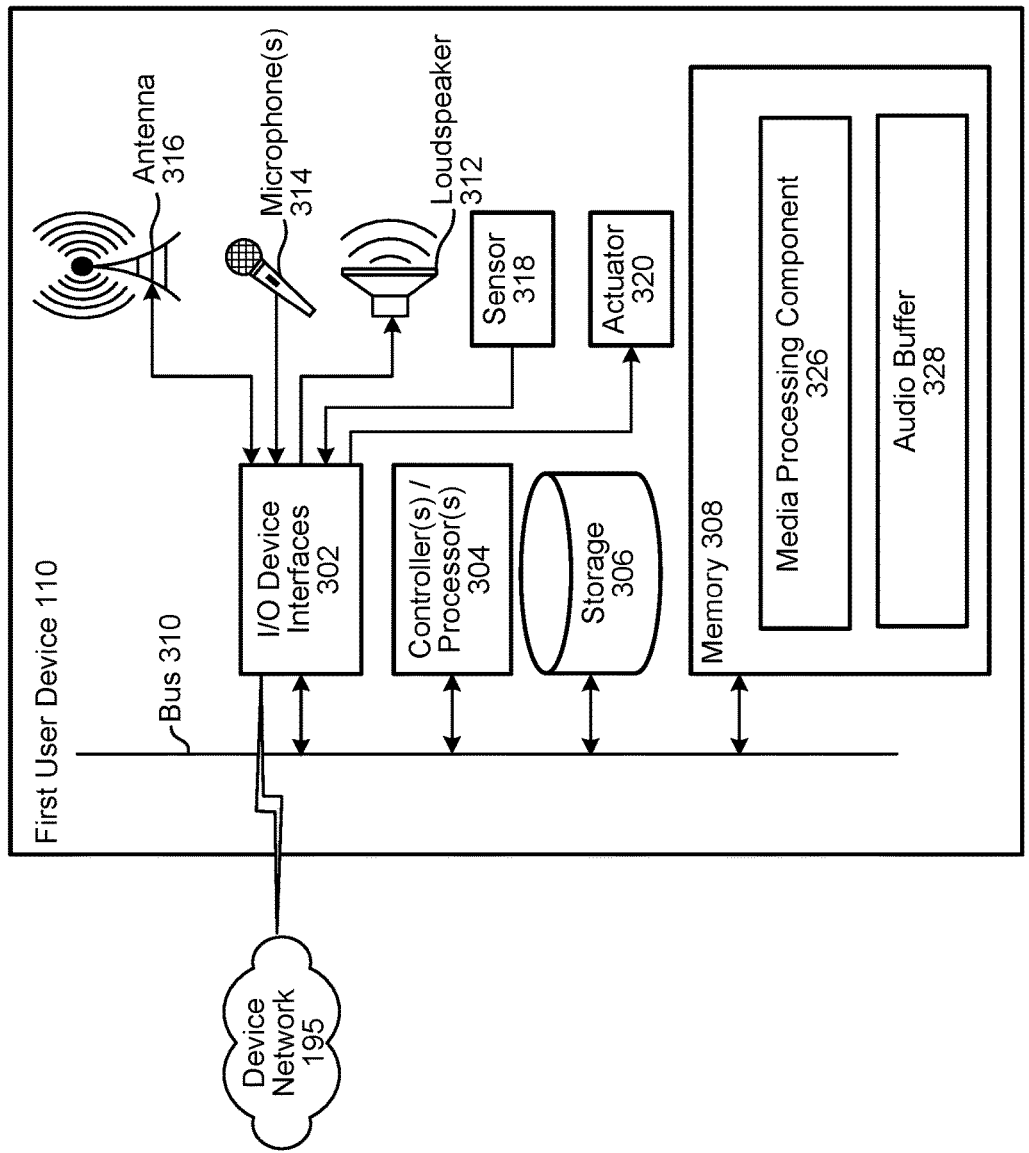
FIG. 3 illustrates a user device managed by a system in accordance with embodiments of the present disclosure.

FIG. 3 is a block diagram conceptually illustrating example components of the first user device 110. The device 110 may include one or more controllers/processors 304, which may each include a central processing unit (CPU) and/or a digital-signal processor (DSP) for processing data and computer-readable instructions, and a memory 308 for storing data and instructions of the respective device. The memory 308 may individually include volatile random access memory (RAM), non-volatile read only memory (ROM), non-volatile magnetoresistive memory (MRAM), and/or other types of memory. The device 110 may also include a data-storage component 306 for storing data and controller/processor-executable instructions. The data storage component 306 may individually include one or more non-volatile storage types such as magnetic storage, optical storage, solid-state storage, etc. The device 110 may also be connected to removable or external non-volatile memory and/or storage (such as a removable memory card, memory key drive, networked storage, etc.) through respective input/output device interfaces 302.

Computer instructions for operating the first user device 110 and its various components may be executed by the respective device's controller(s)/processor(s) 304, using the memory 308 as temporary "working" storage at runtime. A device's computer instructions may be stored in a non-transitory manner in volatile memory 308, non-volatile storage 306, or an external device(s). Alternatively, some or all of the executable instructions may be embedded in hardware or firmware on the respective device in addition to or instead of software.

The computer memory 308 may include instructions that, when executed by the processor 304, perform one or more tasks. For example, the computer memory 308 may include instructions for a media processing component 326, which is described in greater detail below. The computer memory 308 may further include instructions for a voice-activity detector, wakeword detector, text-to-speech system, or other system(s).

The first user device 110 may include input/output device interfaces 302. A variety of components may be connected through the input/output device interfaces 302, as will be discussed further below. Additionally, each device 110 may include an address/data bus 310 for conveying data among components of the device 110. Each component within the device 110 may also be directly connected to other components in addition to (or instead of) being connected to other components across the bus 310.

The input/output device interface 302 may communicate with other components, such as a loudspeaker 312 or other component capable of outputting audio, and a microphone 314 or array of microphones. The input/output device interface 302 may further connect to a sensor, such as a light sensor, and an actuator, such as a switch or relay. Via antenna(s) 316, the input/output device interfaces 302 may connect to one or more networks 195 via a Bluetooth network, wireless local area network (WLAN) (such as WiFi) radio, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network 195, the system may be distributed across a networked environment. The I/O device interface 302 may also include communication components that allow data to be exchanged between devices such as different physical servers in a collection of servers or other components.

FIG. 4A illustrates the media processing component 326 receiving audio data 402 for output by speaker 312. The audio data 402 may be represented by a number of packets of data; each packet may be, for example, 1.5-3.0 kilobytes in size and may be separated in time from other packets by, for example, 100-200 milliseconds and, in some embodiments, 150 milliseconds. A buffer manager 404 may receive the packets and may store them in an audio buffer 406 (which may be implemented using the memory 308). Each packet may include data indicating its intended order; if a packet is received out of order, the buffer manager 404 may re-order the packet in the audio buffer 406. The size of the audio buffer 406 may be small; in some embodiments, the audio buffer 406 may store ten packets.

After audio corresponding to a packet is output using the speaker 312, the buffer manager 404 may delete the packet from the audio buffer 406. If the buffer manager 404 determines that the audio buffer 406 is full and that an out-of-order packet corresponding to output audio has not been received, a playback manager 408 may cause output of the packets in the audio buffer 406 despite not having the out-of-order packet; this output may include a perceptible glitch in the output audio. In other embodiments, if the out-of-order packet is not received in time, the playback manager 408 erases the packets in the audio buffer 406 and sends an indication of the failure to output audio to the device-management system 120, which may then re-send some or all of the packets.

The playback manager 408 may communicate with the processor 304 using a hardware abstraction layer 410. The hardware abstraction layer 410 may include one or more application programming interfaces that abstract details of the processor 304 from the playback manager 408. The processor 304 may include an analog-to-digital and/or digital-to-analog controller 412 and/or a speaker driver 414.

Figure 4B:
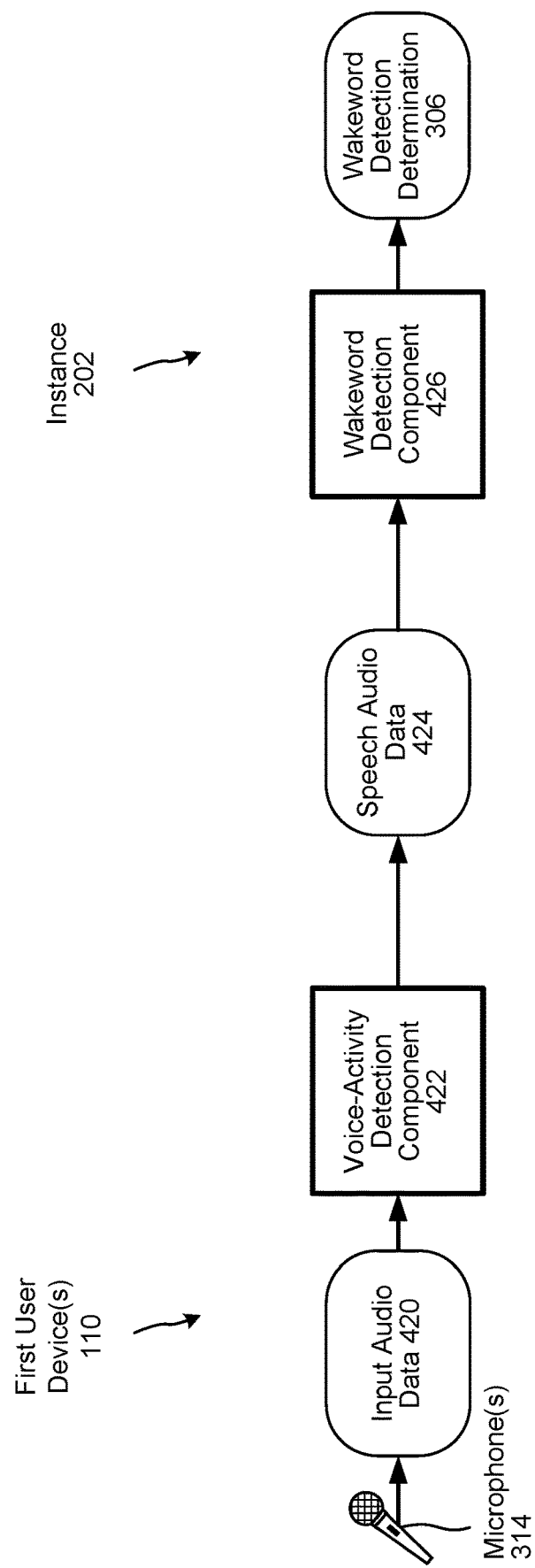

Referring to FIG. 4B, the first user device 110 may receive input audio data 420 using an audio capture component, such as a microphone 314 or array of microphones. Before sending corresponding audio data 420 to the second user device 112, device-communication system 124, and/or device-management system 120, the first user device 110 may use various techniques to first determine whether the first audio data includes speech. For example, the first user device 110 may use a voice activity detection (VAD) component 422 to apply VAD techniques. In other embodiments, the instance 202 includes the VAD component 422. Such VAD techniques may determine whether speech is present in the first audio data based on various quantitative aspects of the first audio data, such as the spectral slope between one or more frames of the first audio data, the energy levels of the first audio data in one or more spectral bands the signal-to-noise ratios of the first audio data in one or more spectral bands; or other quantitative aspects. In other examples, the VAD component 422 may be a trained classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the first audio data to one or more acoustic models in speech storage, which acoustic models may include models corresponding to speech, noise (e.g., environmental noise or background noise), or silence. Still other techniques may be used to determine whether speech is present in the first audio data. In various embodiments, the VAD component 422 consumes less power than the wakeword-detection component, which begins processing audio data (and hence consuming power) only when the VAD component determines that the audio data likely represents speech. In other embodiments, the wakeword-detection component processes all received audio data, and the VAD component 422 is not present or not used.

If the VAD component 422 determines the audio data includes speech, the first user device 110 may send send corresponding speech audio data 424 to a wakeword-detection component 426, which may execute in a corresponding instance 202 and may activate to process the audio data to determine if a wakeword is likely represented therein. Like the VAD component 422, the wakeword-detection component 426 may be disposed on the first user device 110 or in the instance 202. In the former case, following detection of the wakeword, the first user device 110 may send audio data, corresponding to at least an utterance following the wakeword in the audio data, to the device-management system 120.

The wakeword-detection component 426 may process the audio data using trained models to detect a wakeword. The trained models may be CNNs, RNNs, acoustic models, hidden Markov models (HMMs), and/or classifiers. One approach for wakeword detection applies general large vocabulary continuous speech recognition (LVCSR) systems to decode the audio signals, with wakeword searching conducted in the resulting lattices or confusion networks. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword-detection component 426 may use convolutional neural network (CNN)/recursive neural network (RNN) structures directly, without using a HMM. The wakeword-detection component 426 may estimate the posteriors of wakewords with context information, either by stacking frames within a context window for a DNN, or using a RNN. Follow-on posterior threshold tuning or smoothing may be applied for decision making. Other techniques for wakeword detection may also be used.

Figure 4C:
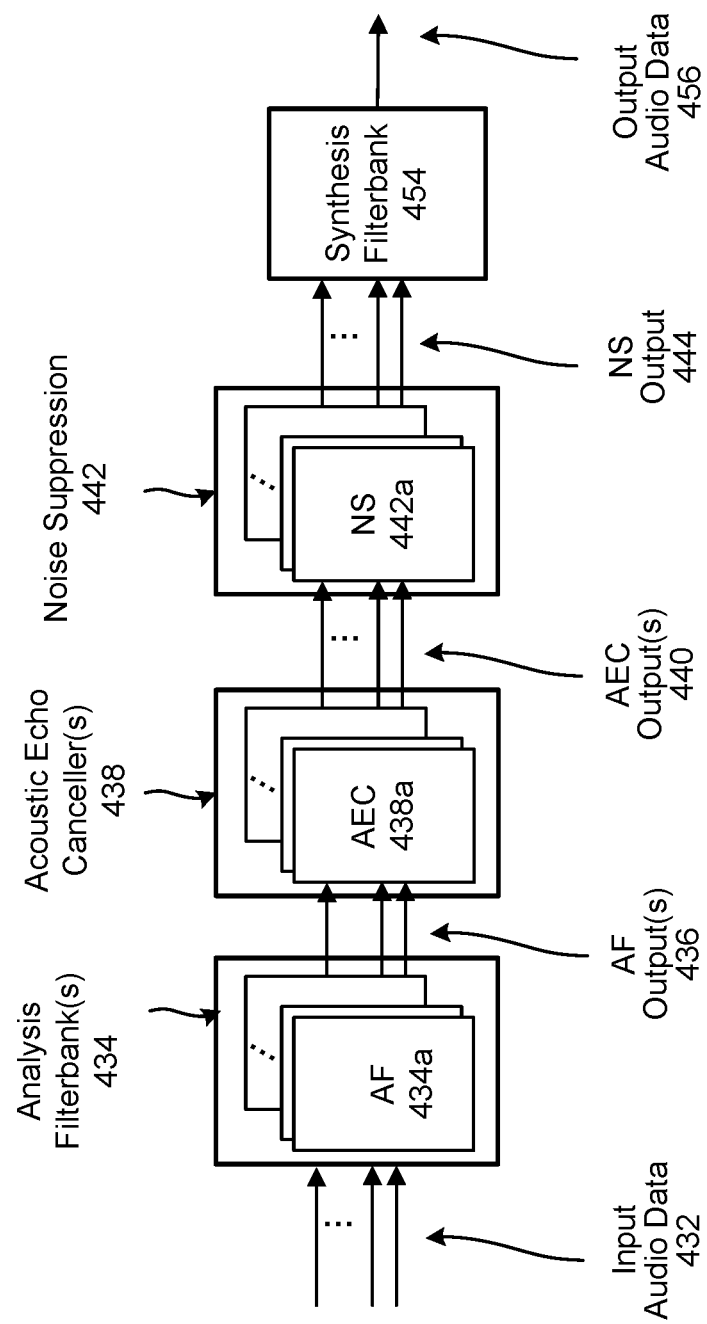

FIG. 4C illustrates a system for audio processing in accordance with embodiments of the present invention. As discussed above, one or more user devices 110 may not be capable of performing one or more audio-processing tasks, such as performing AEC, AES, and/or beamforming. The respective first user device 110 may thus transmit one or more audio signals to the device-management system 120 so that the device-management system 120 may process the audio data in lieu of the first user device 110 doing so.

In various situations, the first user device 110 may output audio and, at the same time or a short time after, capture audio using one or more microphones. The input audio captured by the first user device 110 may, in these situations, include some representation of the output audio. This re-capture of output audio, notably, occurs during two-way communication that involves audio: a first communicator hears his or her speech—after he or she has spoken it—output at the other end of the conversation.

Two ways to reduce or eliminate this undesirable re-capture of the output audio signal—or "echo"—are called acoustic echo cancellation (AEC) and acoustic echo suppression (AES). Regarding AEC, a reference signal corresponding to audio output by the speakers is removed (e.g., subtracted) from audio received from microphones. Because the audio received by the microphones is not exactly the same as the audio output by the loudspeakers—the physical audio channel that is disposed between the microphones and the loudspeakers changes the audio as it passes through—AEC may further include an adaptive filter that models the channel and modifies a local signal, using, e.g., a transfer function that approximates the channel. Using the reference signal and the adaptive filter, the AEC system may thus cancel echoes in received audio data. By removing the echoes, the AEC system may output audio that more closely corresponds to an utterance; when the device-management system 120 sends this audio to a service-provider system 122, the service provider system 122 may more accurately process the audio to more accurately determine a command or request represented therein.

Input audio data 432 is received. Multiple items of input audio data 432 may be received from one or more user devices 110. The input audio data 432 may be formatted as time-domain audio data, such as in a .WAV computer file. An analysis filterbank 434 may receive the audio data 432 and may transform it from time-domain audio data to frequency-domain audio data. The analysis filterbank 434 may perform a Fourier transform, such as a fast Fourier transform (FFT) and/or discrete-time Fourier transform (DTFT), and may include one or more uniform discrete Fourier transform (DFT) filterbanks, which convert the time-domain audio data 432 into frequency-domain audio data AF output 436. The frequency-domain audio data 436 may include a plurality of audio signals Y compartmentalized from the full spectrum of the frequency-domain audio data 436 into a plurality of frequency sub-band domains or "bins." The audio signals Y may incorporate audio signals corresponding to multiple different microphones (from one or more user devices 110) as well as different sub-bands (i.e., frequency ranges) as well as different frame indices (i.e., time ranges). Thus, the audio data 432 from a microphone m may be represented as $X_m(k,n)$, where k denotes the sub-band index and n denotes the frame index. The combination of all audio signals for all m microphones for a particular sub-band index frame index may be represented as $X(k,n)$.

The acoustic-echo cancellation component 438 may, as described above, subtract reference audio data from the frequency-domain audio data 436 using, for example, hardware and/or software configured to subtract data representing a first signal from data representing a second signal. The acoustic-echo cancellation component 438 may delay the reference audio data before subtracting it from the frequency-domain audio data 436 to account for the delay in outputting the far-end audio data and re-receiving it via the microphone array. The acoustic-echo cancellation component 438 may include an adaptive filter, such as a finite impulse-response (FIR) filter, that is configured to minimize an error signal between an output of the filter and the near-end audio.

In various embodiments, the AEC component 438 determines how much to delay the reference audio data before subtracting it from the frequency-domain audio data 436 based on time data received from a corresponding first user device 110. Some networking protocols, such as Bluetooth, may have a variable latency when transmitting and receiving data, such as audio data sent from the device-management system 120 to a first user device 110, and this latency may vary on a number of unpredictable factors, such as a number of dropped packets. The device-management system 120 may not, therefore, know how much to delay the reference audio data without receiving and processing the time data. The first user device 110 may thus be configured to determine a time of output of audio data received from the device-management system 120 and to transmit this time data to the device-management system 120. The first user device 110 may send this time data periodically, such as every ten seconds, when it is outputting audio data. The first user device 110 may further send the time data upon beginning to output audio and/or when ending outputting audio. The AEC component 438 may thus determine the variable latency by subtracting the time indicated by the time data with a current time. The AEC component 438 may then configure a variable-delay element, such as a filter, to reflect this variable latency and may then process the reference audio data with this variable-delay element to delay it in accordance with the variable latency. The AEC component 438 may then use the delayed reference audio data to cancel echoes in the input audio data.

A first instance 202 may include a first AEC component 438, and a second instance 202 may include a second AEC component 438. The first instance 202 may be associated with a first user device A 110a, and the second instance may be associated with a first user device B 110a. The user devices 110 may capture similar audio data that each include representations of an utterance. The orchestrator component 204 may, in some embodiments, select the output of only one AEC component 438 for further processing (e.g., speech processing). The orchestrator component 204 may perform this selection by determining one or more quality metrics, such as SNR, for the outputs of the AEC components 438 and selecting the output with the higher SNR.

In some embodiments, the AEC component 438 does not perform the echo cancellation using the reference signal if the delay satisfies a condition (e.g., is greater than a threshold, such as 100-500 milliseconds). The delay may be greater than the threshold if, for example, too many packets (e.g., more than 50% of packets) of the audio data sent to the first user device 110 are dropped during transmission of the audio data. The threshold may be determined based on a maximum delay of the filter.

In some embodiments, a synthesis filterbank 454 receives the AEC outputs 440 and converts, or synthesizes, the frequency-domain AEC outputs 440—which may include two or more frequency bins—into time-domain output audio data 456. The synthesis filterbank 454 may include one or more filters, such as FIR filters, that perform one or more inverse Fourier transforms (IFTs), which may be, for example, discrete-time inverse Fourier transfers. A number of elements that perform the Fourier transforms may correspond to the number of frequency bins—e.g., each frequency bin.

In some embodiments, prior to the synthesis filterbank 454 generating the output audio data 456, a noise-suppression component 442 processes the output 440 of the AEC component to further reduce echo in the output 440. The noise-suppression component 442 may be a filter, such as an FIR filter, that is configured to suppress undesirable audio in the output 440, such as far-end speech, but to leave desirable audio, such as near-end speech, substantially unaffected in its output 444. The noise-suppression component 442 may thus be configured to detect when the output 440 includes a representation of near-end speech but not far-end speech; in this situation, the noise-suppression component 442 may leave the output 440 substantially unaffected. If, however, the noise-suppression component 442 determines that the output 440 includes a representation of far-end speech but not near-end speech, the noise-suppression component 442 may suppress (e.g., reduce a volume level of) the output 440. The noise-suppression component 442 may suppress audio in some or all frequency bins.

Figure 4D:
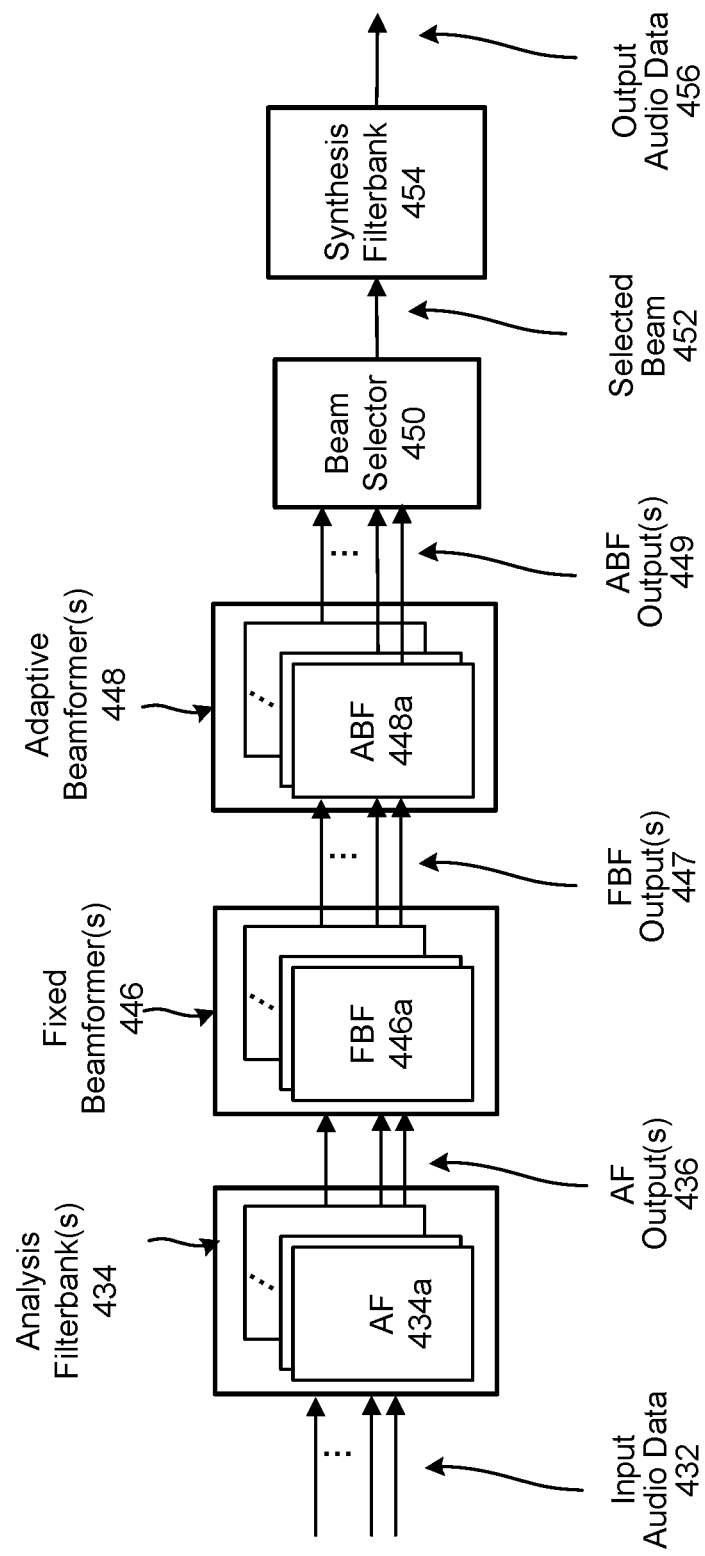

FIG. 4D illustrates additional components for audio processing that may be included—instead or in addition to the AEC and/or AES components described above—on the instance 202 of the device-management system 120. These components may include a fixed beamforming component 446 and/or an adaptive beamforming component 448. In various embodiments, the beamformers 446, 448 determine directional audio data in accordance with values of a matrix, referred to herein as a covariance matrix. The beamformers 446, 448 boost audio from a target direction while suppressing audio from other directions.

As described herein, beamforming (e.g., performing a direction-based separation of audio data) corresponds to generating a plurality of directional audio signals (e.g., beamformed audio data) corresponding to individual directions relative to a microphone array. A first beam may correspond to first beamformed audio data associated with a first direction (e.g., portions of the input audio signals corresponding to the first direction), a second beam may correspond to second beamformed audio data associated with a second direction (e.g., portions of the input audio signals corresponding to the second direction), and so on. As used herein, "beams" refer to the beamformed audio signals that are generated by the beamforming operation. Therefore, a first beam corresponds to first audio data associated with a first direction, whereas a first directional calculation corresponds to the first filter coefficient values used to generate the first beam.

For example, the beamforming operation may individually filter input audio signals generated by multiple microphones in a microphone array (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on.

To perform the beamforming operation, the beamformers 446, 448 may apply directional calculations to input audio signals. In some examples, the beamformers 446, 448 perform the directional calculations by applying filters to the input audio signals using filter coefficient values associated with specific directions. For example, the beamformers 446, 448 may perform a first directional calculation by applying first filter coefficient values to the input audio signals to generate the first beamformed audio data and may perform a second directional calculation by applying second filter coefficient values to the input audio signals to generate the second beamformed audio data.

In one example of a fixed beamformer system, a fixed beamformer employs a filter-and-sum structure to boost an audio signal that originates from a desired direction (sometimes referred to as the look-direction) while largely attenuating audio signals that original from other directions. A fixed beamformer unit may effectively eliminate certain diffuse noise (e.g., undesirable audio), which is detectable in similar energies from various directions, but may be less effective in eliminating noise emanating from a single source in a particular non-desired direction. The beamformer may further include an adaptive beamformer that may adaptively cancel noise from different directions, depending on audio conditions.

Beamforming may be performed by determining filter coefficient values (e.g., Finite Impulse Response (FIR) filter coefficient values) for each beam direction (e.g., look direction, direction of interest, etc.) based on a position of physical microphones in a microphone array. For example, a first position of a first physical microphone may correspond to a first filter coefficient associated with a first direction and a second position of a second physical microphone may correspond to a second filter coefficient associated with the first direction. Thus, to generate beamformed audio data in the first direction, the beamformer may apply the first filter coefficient value to first audio data captured by the first physical microphone and apply the second filter coefficient value to second audio data captured by the second physical microphone.

The filter coefficient values may be determined using minimum variance distortionless response (MVDR) beamformer techniques, Linearly Constrained Minimum Variance (LCMV) beamformer techniques, and/or generalized eigenvalue (GEV) beamformer techniques, although the disclosure is not limited thereto and the filter coefficient values may be determined using any technique known to one of skill in the art without departing from the disclosure.

The filter coefficient values used to perform the beamforming operations may be calculated offline (e.g., preconfigured ahead of time) and stored in the instance 202. In various embodiments, a computer model of the first user device 110 may be constructed using, for example, computer-aided design (CAD) software. The model may then be analyzed using a finite-element model (FEM) application; based on the FEM analysis, the acoustic properties of each microphone may be determined for each incident angle. These properties may then be used to determine the values of the above-referenced matrices.

The adaptive beamformer 448 may include one or more adjustable FIR filters that estimate the acoustic properties of the environment of the device 110 based on one or more transfer functions. The adaptive beamformer 448 may determine a desired beam based at least in part on a beam selector 620, which may determine that a particular beam corresponds to a direction of a desired sound, such as a speaker. The adaptive beamformer 448 may further determine a reference beam, such as a beam that corresponds to a direction of noise, and process the audio of the desired beam to reduce or remove audio associated with the noise.

The beam selector 450 receives the output 449 of the adaptive beamformer 448 and, in accordance with the various techniques described herein, such as selecting a loudest beam, selects data corresponding to a selected beam 452. The beam selector 450 may select one or more of the beams as output beams. For example, the beam selector 450 may determine one or more signal quality values (e.g., loudness, SNR, power value, signal-to-noise plus interference ratio (SINR), and/or other signal quality metrics known to one of skill in the art) associated with each of the outputs 449 of the adaptive beamformer 448 and may select the selected beam 452 having the highest signal quality metric. In various embodiments, the beam selector 450 is capable of selecting a new beam every 100-200 milliseconds.

Figure 5:
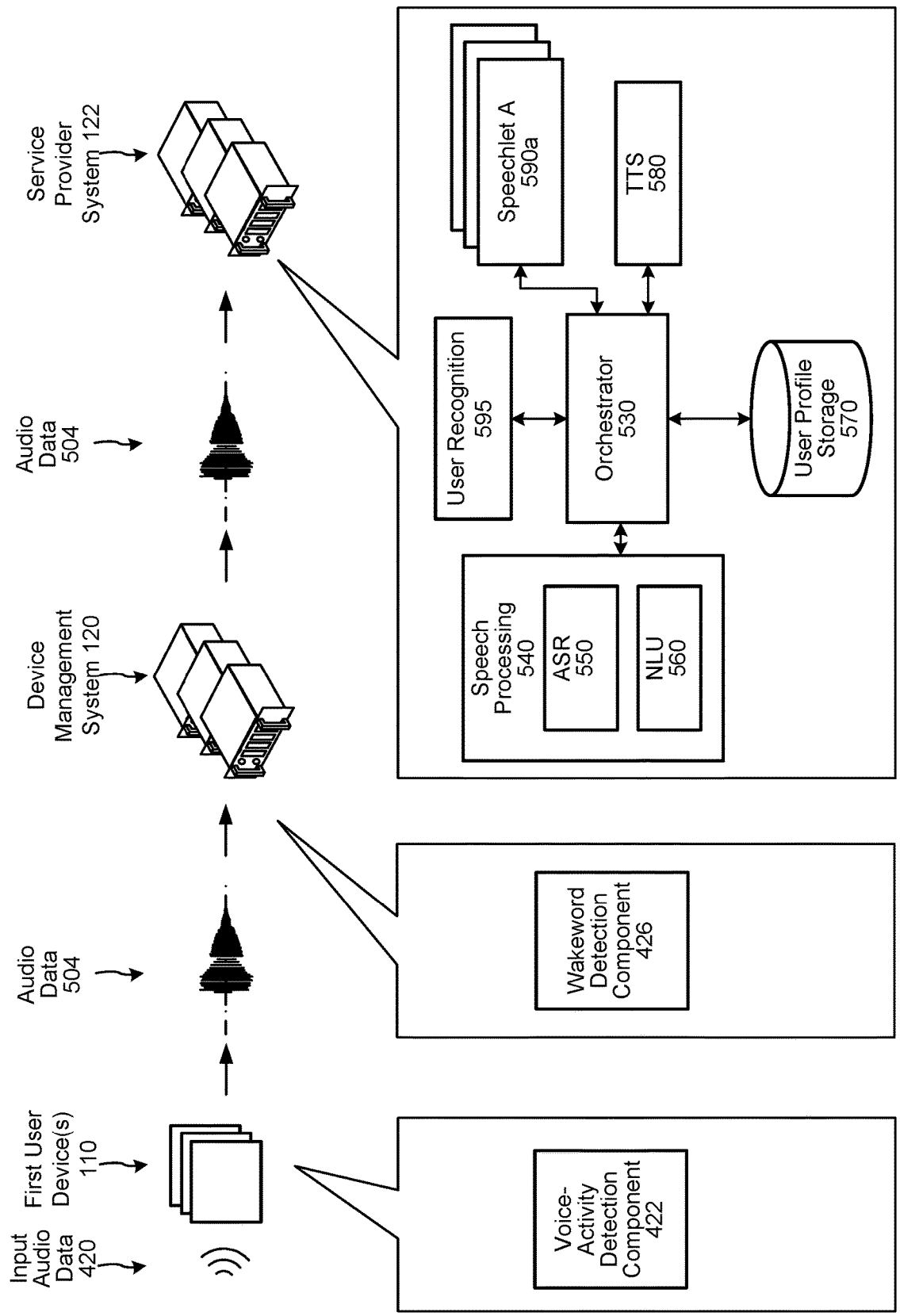
FIG. 5 illustrates a speech-processing system in accordance with embodiments of the present disclosure.

FIG. 5 illustrates a speech-processing system in accordance with embodiments of the present invention. After wakeword detection, the device-management system 120 may send corresponding audio data to the service-provider system 122. Upon receipt by the service-provider system 120, the audio data 504 may be sent to an orchestrator component 530. The orchestrator component 530 may include memory and logic that enables the orchestrator component 530 to transmit various pieces and forms of data to various components of the system.

The orchestrator component 530 sends the audio data to a speech-processing component 540. The speech-processing component 540 may include different components for different languages. One or more components may be selected based on determination of one or more languages. A selected ASR component 550 of the speech processing component 540 transcribes the audio data 504 into text data representing one more hypotheses representing speech contained in the audio data 504. The ASR component 550 interprets the utterance in the audio data 504 based on a similarity between the utterance and pre-established language models. For example, the ASR component 550 may compare the audio data 504 with models for sounds (e.g., subword units, such as phonemes, etc.) and sequences of sounds to identify words that match the sequence of sounds spoken in the utterance represented in the audio data 504. The ASR component 550 sends (either directly or via the orchestrator component 530) the text data generated thereby to a corresponding selected NLU component 560 of the speech processing component 540. The text data output by the ASR component 550 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The NLU component 560 attempts, based on the selected language, to make a semantic interpretation of the phrases or statements represented in the text data input thereto. That is, the NLU component 560 determines one or more meanings associated with the phrases or statements represented in the text data based on individual words represented in the text data. The NLU component 560 determines an intent (e.g., a system action that a user desires the system to perform) representative of text data as well as pertinent pieces of information in the text data that allow a device (e.g., the first user device 110, the service-provider system 122, etc.) to execute the intent. For example, if the text data corresponds to "play Africa by Toto," the NLU component 560 may determine a user intended the system to output the song Africa performed by the band Toto, which the NLU component 560 determines is represented by a <PlayMusic> intent.

The orchestrator component 530 (or another component of the service-provider system 122) may send NLU results data to a speechlet component 590 associated with the intent. The speechlet component 590 determines output data based on the NLU results data. For example, if the NLU results data includes intent data corresponding to <PlayMusic> and tagged text corresponding to <Artist: Toto>, the orchestrator 530 (or other component of the service-provider system 122) may send the NLU results data to a music speechlet component, which determines Toto music audio data for output by the system.

A "speechlet" may be software running on the service-provider system 122 that is akin to an application. That is, a speechlet may enable the service-provider system 122 to execute specific functionality in order to provide data or produce some other output requested by the user. The service-provider system 122 may be configured with more than one speechlet. For example, a weather speechlet may enable the service-provider system 122 to provide weather information, a ride-sharing speechlet may enable the service-provider system 122 to book a trip with respect to a taxi or ride sharing service, and a food-order speechlet may enable the service-provider system 122 to order a pizza with respect to a restaurant's online ordering system.

In some instances, a speechlet 590 may provide output text data responsive to received NLU results data. The service-provider system 122 may include a text-to-speech (TTS) component 580 that generates output audio data from speechlet provided output text data. The TTS component 580 may use different synthesis techniques. In one method of synthesis, called unit selection, the TTS component 580 analyzes text data against a database of recorded speech. The TTS component 580 selects units of recorded speech matching the text data and concatenates the units together to form output audio data. In another method of synthesis called parametric synthesis, the TTS component 580 varies parameters such as frequency, volume, and noise to create output audio data including an artificial speech waveform. Parametric synthesis uses a computerized voice generator, sometimes called a vocoder. In another method of speech synthesis, a trained model called a sequence-to-sequence model directly generates output audio data based on the input text data.

The service-provider system 122 may include a user-recognition component 595. The user-recognition component 595 may receive the audio data 504 and/or text data output by the ASR component 550. The user-recognition component 595 may determine scores indicating whether the speech represented in the audio data 504 originated from a particular user. For example, a first score may indicate a likelihood that the speech originated from a first user and a second score may indicate a likelihood that the speech originated from a second user. The user-recognition component 595 may also determine an overall confidence regarding the accuracy of user recognition operations. The user-recognition component 595 may perform user recognition by comparing audio characteristics in the audio data 504 to stored audio characteristics of users. The user-recognition component 595 may also perform user recognition by comparing biometric data (e.g., fingerprint data, iris data, etc.) received by the system in correlation with the audio to stored biometric data of users. The user-recognition component 595 may further perform user recognition by comparing image data (e.g., including a representation of at least a feature of a user) received by the system in correlation with the audio with stored image data (e.g., including representations of features of users). The user-recognition component 595 may perform additional user recognition processes. Output of the user-recognition component 595 may be used to inform NLU processing as well as processing performed by speechlets 590.

The service-provider system 122 may include a user-profile storage 570. The user profile storage 570 may include a variety of information related to individual users and/or groups of users that interact with the service-provider system 122. The user-profile storage 570 may include one or more user profiles. Each user profile may be associated with a different user ID; this user ID may be sent to the user device, as described above. A user profile may be an umbrella profile specific to one or a group of users. That is, a user profile may encompass two or more individual user profiles, each associated with a respective user ID. For example, a user profile may be a household profile that encompasses user profiles associated with multiple users of a single household. A user profile may include preferences shared by all the user profiles encompassed thereby. Each user profile encompassed under a single user profile may include preferences specific to the user associated therewith. That is, each user profile may include preferences unique from one or more other user profiles encompassed by the same user profile. A user profile may be a stand-alone profile or may be encompassed under another user profile. As illustrated, the user profile storage 570 is implemented as part of the service-provider system 122. The user profile storage 570 may, however, may be disposed in a different system in communication with the service-provider system 122, for example over a network. User-profile data may be used to inform NLU processing as well as processing performed by a speechlet 590.

As described above, the wakeword-detection component 426 may implement device specific and/or user specific machine learned models. One or more machine learned models may, however, be trained using both device specific speech-processing data and user specific speech processing data. The more data types used to train a machine learning model, the more accurate a resulting trained model may be in predicting whether the wakeword detection sensitivity should be lowered. For example, other data that may be used to train a machine learning model includes a type of the first user device 110 or a location of the first user device 110 (e.g., a geographic location or a location with a building).

Users may speak a first wakeword followed by a first command to a device and thereafter speak a second wakeword followed by a second command to the device. Moreover, an intent of the first command may indicate to the system that the device is likely to receive the second wakeword and second command. For example, a user may routinely say "Alexa, play [artist name]," with "Alexa" corresponding to a first wakeword and "play [artist name]" corresponding to a <PlayMusic> intent. After a user speaks such, it may that the user says "Alexa, [increase or decrease] the volume," with "Alexa" corresponding to a second wakeword and "play [increase or decrease] the volume" corresponding to a <ChangeVolume> intent. Because the user routinely speaks the command corresponding to the <ChangeVolume> intent after the user speaks the command corresponding to the <PlayMusic> intent, the service-provider system 122 may infer that the wakeword detection sensitivity should be lowered when the system determines a command corresponding to a <PlayMusic> intent.

In some implementations, the service-provider system 122 may receive input audio data from the device-management system 120 as well as receive indications from the device-management system 120 that the first user device 110 and/or Device-management system 120 detected a wakeword and that the wakeword corresponds to a language. The service-provider system 122 may perform processes to confirm that the wakeword is present in the input audio data using a model trained using data accessible to the service-provider system 122. This may be beneficial if the first user device 110 and/or Device-management system 120 performs unreliable wakeword detection or, at least, less-reliable wakeword detection than the service-provider system 122.

The aforementioned models and other models described herein may be trained and operated according to various machine-learning techniques. Such techniques may include, for example, neural networks (such as convolutional neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. For example, a SVM is a supervised learning model with associated learning algorithms that analyze data and recognize patterns in the data and may be used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine-learning techniques, machine learning processes themselves need to be trained. Training a machine learning component may include establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. During training, the training data may be applied to a model and the output of the model may be evaluated for its accuracy in producing the expected output specified by the training data. The model may be updated in accordance with, for example, a gradient-descent algorithm, in which one or more weights of the model are back filled.

The user profile storage 570 includes data regarding individual user profiles. Each user profile may include information indicating various devices, output capabilities of each of the various devices, and/or a location of each of the various devices. The device-profile data represents a profile specific to a device. For example, device profile data may represent various user profiles that are associated with the device, speech processing that was performed with respect to audio data received from the device, instances when the device detected a wakeword, etc. In contrast, user-profile data represents a profile specific to a user.

Figure 6B:
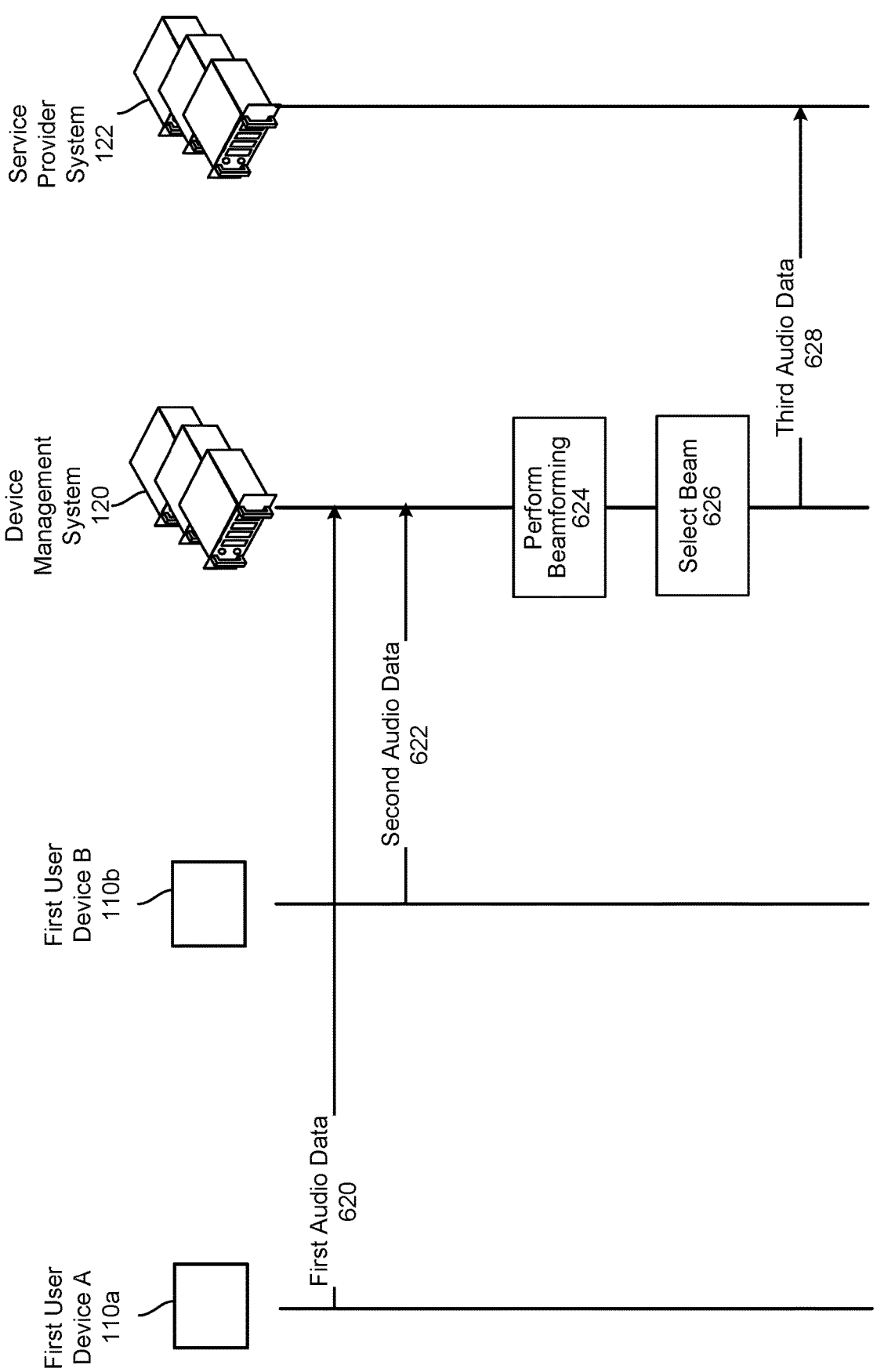

FIGS. 6A and 6B illustrate steps of methods for acoustic processing instance in accordance with embodiments of the present disclosure. Referring first to FIG. 6A, in various embodiments, a device-management system 120 receives first audio data 602 from a service-provider system 122. As discussed above, the device-management system 120 may be disposed remotely to user devices 110 or locally to the user devices 110. The first audio data 602 may represent, for example, music, speech, sounds, or other audio. The device management system 120 may send the first audio data 602 to a first user device 110*b*.

The first user device 110*b* may output (604) audio corresponding to the first audio data 602. As discussed herein, a microphone of the first user device 110*b* (or other first user device 110*a* may receive audio representing desired audio (such as an utterance of a speaker) as well as undesired audio (such as a representation of the first audio data 602 just output by the first user device 110*b*. The first user device 110*b* may send second audio data 606 that includes a representation of audio received by its microphone to the device management system 120. The first user device 110*b* may further send time data 608 to the device-management system 120. The time data 608 may be one or more floating-point or integer numbers that represents a time of output of the first audio data 602 by the first user device 110*b*. The time data 608 may further include or be accompanied by data identifying the first user device 110*b* and/or first audio data 602.

As explained above, the device-management system 120 may use the time data 608 to perform AEC using the second audio data 606. In various embodiments, the device-management system 120 aligns the second audio data 606 with reference audio data (e.g., the first audio data 602) using the time data 438.

Referring to FIG. 6B, the device-management system 120 may receive first audio data 620 from a first first user device 110*a* and may receive second audio data 622 from a second first user device 110*b*. Based on at least these two items of audio data, the device-management system 120 may perform beamforming 454 on the audio data 620, 622. As explained above, beamforming refers to applying on or more processing components, such as filters, to two or more sources of audio data to determine directional audio data corresponding to a direction, such as a direction corresponding to a desired speaker. If two or more items of audio data are received from a single user device, the device-management system 120 may identify a type or model of the user device and may thus determine an orientation of microphones of a microphone array of the user device. The device-management system 120 may thus determine the coefficients of the beamformers (as discussed above) based at least in part on this determined orientation.

If, on the other hand, at least two items of audio data are received from at least two separate user devices 110, the device-management system 120 may not know the orientation of the microphones of the user devices 110 with respect to each other. In other words, because the device-management system 120 may not know the positions of the user devices 120 within the room or other environment in which they may be disposed, the device-management system 120 may not know the coefficients to use for beamforming. In these embodiments, the device-management system 120 may determine the relative positions of the user devices 120 by, for example, triangulating their positions based on a network round-trip time. The device-management system 120 may also or instead prompt a user to input the positions of the user devices 120. The device-management system 120 may further determine the coefficients by experimentation by, for example, varying them linearly until a signal-quality metric, such as SNR, is maximized.

Figure 7B:
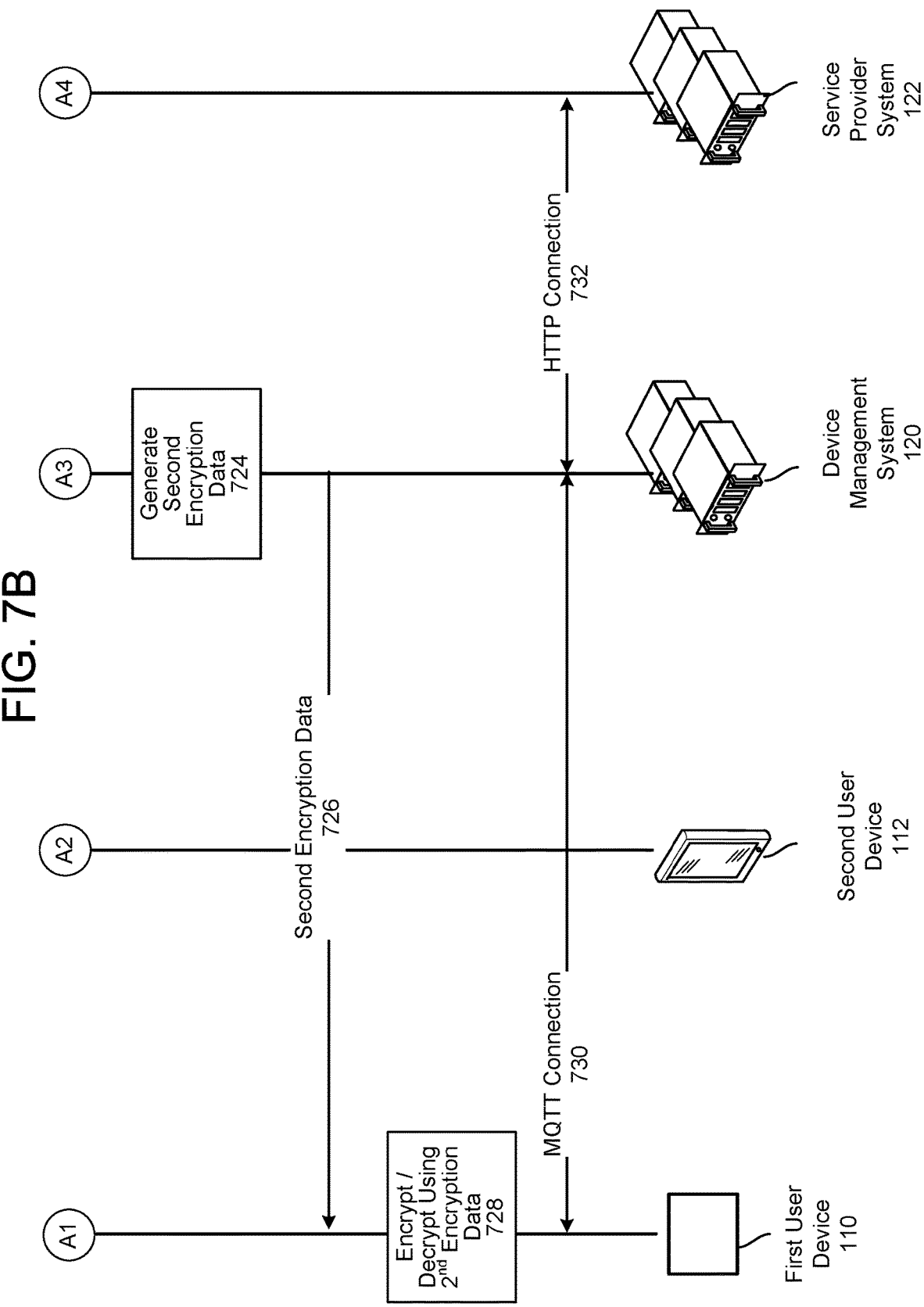

FIGS. 7A and 7B illustrate steps of a method for registering a first user device 110 in accordance with embodiments of the present disclosure. In a first step, the second user device 112 sends (702) an account logon request to the service-provider system 122. As described above, the second user device 112 may perform this step using a web browser or a stand-alone application. The service-provider system 122 verifies (704) that the received account information (e.g., username and password) matches stored account information. If so, the service-provider system sends (706) account login confirmation to the second user device 112. The account login confirmation may include a unique sequence of letters, numbers, or other symbols that identify the associated user account.

The first user device 110 executes (708) an initial activation and/or reset event and sends (710), to the second user device 112, a notification of said activation using a local network such as a WiFi network. In response, the second user device 112 sends (712), to the first user device 110, account information that may include the unique sequence that identifies the associated user account.

The first user device 110 then sends (714), to the device-management system, a registration request. The registration request may include or be accompanied by device information (716), such as a MAC address, that identifies the first user device 110, the account information (718), and/or first encryption data (720), which may include a public encryption key. The public encryption key may be associated with a private encryption key; the keys may be stored in a memory of the device 110.

The device-management system 120 may then forward some or all of this registration data to the service-provider system 122. The device-management system 120 may further create an instance for the first user device 110, as described above; this creation may occur during this registration process or later. The device-management system 124 may then create second encryption data using the first encryption data; this second encryption data may be a shared encryption key for encrypting and decrypting data. The device-management system 124 may then send (726) this second encryption data to the device-management system 120, which may then send it to the first user device 110. The first user device 110 may then create a shared key based on its own private key and the received second encryption data (e.g., the public key of the device-management system 120) and may then use this shared key to encrypt and decrypt (728) data to establish the user device network (630), which may be a MQTT network. The device-management system 120 and the service-provider system 122 may communicate using an HTTP connection (632).

FIGS. 7A and 7B illustrate steps of methods for activating and de-activating an instance in accordance with embodiments of the present disclosure. In FIG. 7A, the MQTT connection (630) and the HTTP connection (632) have been established as described above. As also described above, however, the device-management system 120 has de-allocated an instance associated with the first user device 110 due to inactivity. The first user device 110, however, sends (702) first data to the device-management system 120; this first data may correspond to a command or request of a user. The first data includes information identifying the first user device 110. The device-management system 120 determines (704) information about the first user device 110, such as its MAC address and/or a user account associated with the first user device 110 using this first data. The device-management system 120 then activates (706) an instance corresponding to the first user device 110, as described above. The device-management system 120 may then send (708) second data to the first user device 110; this second data may correspond to a response to the command or request of the first data. In FIG. 7B, the device-management system 120 determines (710) that a length of time since the first user device 110 last sent data is greater that a threshold (e.g., a device-activity timeout). The device-management system 120 then stores (712) data corresponding to a state of the instance and deactivates (714) the instance.

Figure 8A:
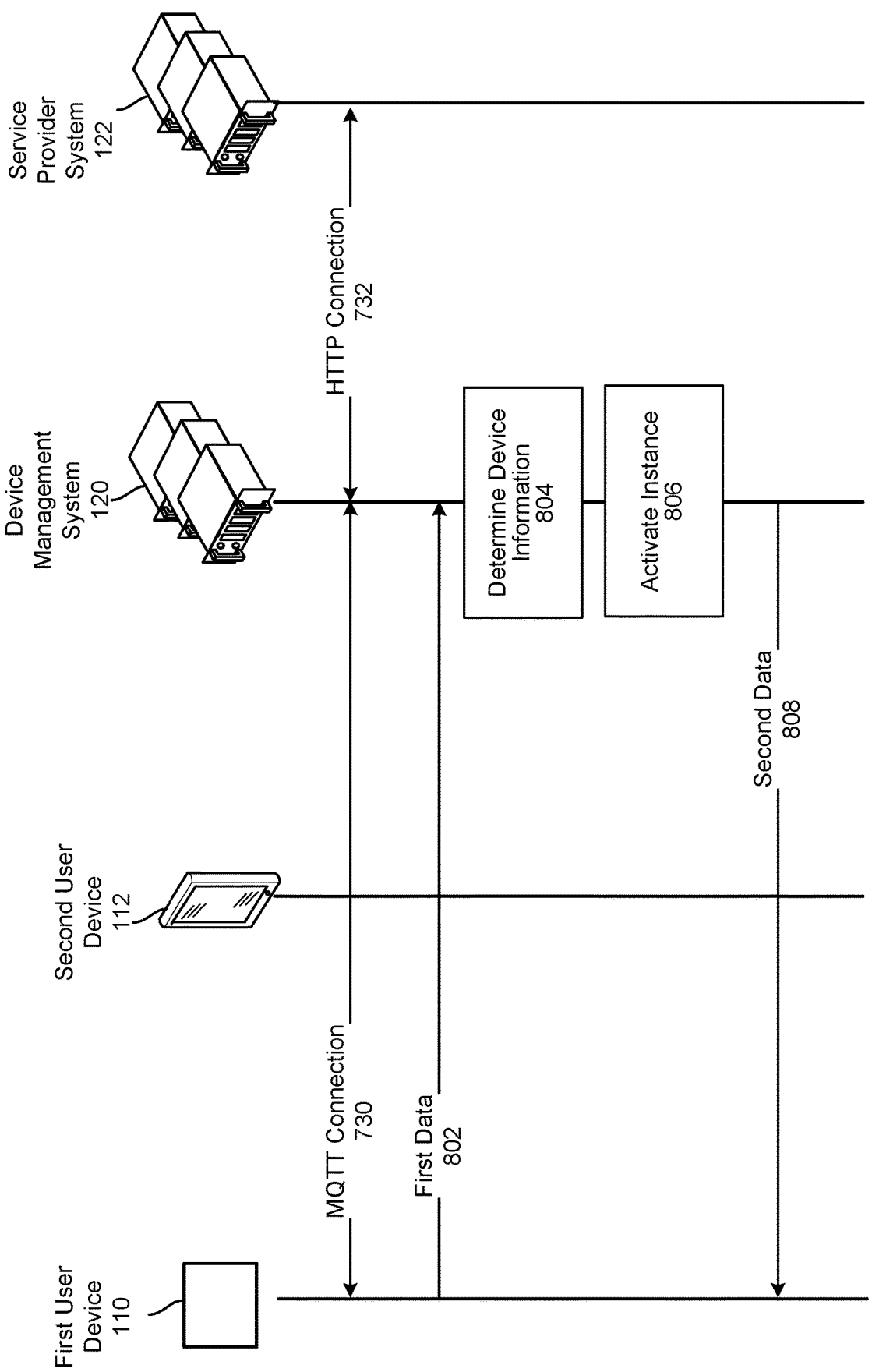

FIGS. 8A and 8B illustrate steps of a method for transcoding data in accordance with embodiments of the present disclosure. The first user device 110 sends (802), to the device-management system 120, first data, which may include a representation of a command to output audio, video, or other media. The device-management system 120 may process the first data (e.g., may perform wakeword-detection on the first data) or, if the first user device 110 has already processed the first data (by, e.g., performing wakeword detection), the device-management system 120 may simply forward the first data to the service-provider system 122.

The service-provider system 122 may perform speech processing and/or natural-language understanding using the first data, as described herein, to determine (804) that the first data includes the representation of the command to output audio. The service-provider system 122 may further determine other information about the audio, such as a song title, artist, video description, or other information that identifies the item of media to be output. The service-provider system 122 may then send (806) audio data representing the result to the device-management system 120.

The device-management system 120 may then determine that the audio data is in a format that is not playable using the first user device 110 because, for example, the audio data requires decoding using a codec not implemented by the first user device 110. The device-management system 120 may make this determination by determining the source of the audio data (e.g., which streaming service created the audio data) and/or by examining metadata associated with the audio data that indicates the source and/or coding format. The device-management system 120 may then transcode (808) the audio data into a format that is decodable by the first user device 110 and send (810) the transcoded audio data to the first user device 110. The first user device 110 may then decode (812) the transcoded audio data and output (814) corresponding audio.

FIG. 9 illustrates a method for sending data in accordance with embodiments of the present disclosure. As mentioned above, a data stream 902 to and/or from the first user device 110 may include data formatted in a number of packets 904. Each packet may include 1.5-3.0 kilobytes of information, and each data may be separated in time from neighboring packets by 100-200 milliseconds and, in some embodiments, 150 milliseconds.

FIG. 10 is a block diagram conceptually illustrating example components of a system, such as the device-management system 120, service-provider system 120, and/or Device-communication system 134, which may perform user device management and assist with ASR processing, NLU processing, etc. Multiple servers may be included in the systems 120/122/124, such as one or more servers for performing ASR, one or more servers for performing NLU, etc. In operation, each of these systems may include computer-readable and computer-executable instructions that reside on the respective device 120/122/124, as discussed further below.

The system 120/122/124 may include one or more controllers/processors 1002, which may each include a central processing unit (CPU) for processing data and computer-readable instructions, and a memory 1004 for storing data and instructions of the respective device. The memory 1004 may individually include volatile random access memory (RAM), non-volatile read only memory (ROM), non-volatile magnetoresistive memory (MRAM), and/or other types of memory. The system 120/122/124 may also include a data storage component 1006 for storing data and controller/processor-executable instructions. Each data storage component 1006 may individually include one or more non-volatile storage types such as magnetic storage, optical storage, solid-state storage, etc. The system 120/122/124 may also be connected to removable or external non-volatile memory and/or storage (such as a removable memory card, memory key drive, networked storage, etc.) through respective input/output device interfaces 1008.

Computer instructions for operating the system 120/122/124 and its various components may be executed by the respective system's controller(s)/processor(s) 1002, using the memory 1004 as temporary "working" storage at runtime. A system's computer instructions may be stored in a non-transitory manner in non-volatile memory 1004, storage 1006, or an external device(s). Alternatively, some or all of the executable instructions may be embedded in hardware or firmware on the respective device in addition to or instead of software.

The system 120/122/124 may include input/output device interfaces 1008. A variety of components may be connected through the input/output device interfaces 1008, as will be discussed further below. Additionally, each system 120/122/124 may include an address/data bus 1024 for conveying data among components of the respective device. Each component within a system 120/122/124 may also be directly connected to other components in addition to (or instead of) being connected to other components across the bus 1024.

Referring to FIG. 11, additional devices may communicate with the system 120/122/124. As noted above, multiple devices may be employed in a single system. In such a multi-device system, each of the devices may include different components for performing different aspects of the system's processing. The multiple devices may include overlapping components. The components of the device 110 and the system 120, as described herein, are illustrative, and may be located as a stand-alone device or may be included, in whole or in part, as a component of a larger device or system.

The network 195/199 may include a local or private network or may include a wide-area network, such as the Internet. Devices may be connected to the network 199 through either wired or wireless connections. For example, the second user device 112, which may be a speech-controlled device 112*a*, a smart phone 112*b*, a tablet computer 112*d*, a desktop computer 112*e*, and/or laptop computer 112*f*, may be connected to the network 199 through a wireless service provider, over a WiFi or cellular network connection, or the like. Other devices are included as network-connected support devices, such as the system 120/122/124, or others. The support devices may connect to the network 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a system, first audio data;
   sending, at a first time and using a network, the first audio data to a first device;
   receiving, from the first device, second audio data, the second audio data including a representation of the first audio data;
   receiving, from the first device, an indication that the second audio data corresponds to an utterance;
   receiving, from the first device, an indication of a second time corresponding to a time of output, by the first device, of audio corresponding to the first audio data;
   determining, using the indication of the second time, a time difference between the first time and the second time, wherein the time difference corresponds to a latency of the network;
   configuring a filter using the time difference, the filter corresponding to a delay;
   processing the first audio data using the filter to create delayed first audio data;
   performing acoustic echo cancellation using the delayed first audio data and the second audio data to remove at least a portion of the first audio data from the second audio data to generate third audio data; and
   sending, to the system, the third audio data.

2. The computer-implemented method of claim 1, further comprising:
   determining a first quality metric value representing the third audio data;
   determining a second quality metric value representing fourth audio data associated with a second device; and
   prior to sending the third audio data, determining that the first quality metric value represents a better quality than the second quality metric value,
   wherein sending the third audio data is based at least in part on determining that the first quality metric value represents the better quality.

3. The computer-implemented method of claim 1, further comprising:
   determining that the second audio data corresponds to header data indicating a device identifier;
   indexing a computer memory using the header data to determine status data corresponding to the first device; and
   generating, using the status data, an instance of a virtual machine corresponding to the first device, the instance including a wakeword-detection component and an acoustic-echo cancellation component.

4. The computer-implemented method of claim 3 further comprising:
- determining that the first device has been inactive for one hour;
- after determining that the first device has been inactive, storing, at a location in the computer memory corresponding to the device identifier, second status data corresponding to the instance; and
- removing the instance from the computer memory.

5. A computer-implemented method comprising:
- sending, to a first device, first audio data;
- causing the first device to output first audio corresponding to the first audio data;
- receiving, from the first device, second audio data, the second audio data including a representation of at least a portion of the first audio;
- receiving, from the first device, time data corresponding to a time of output of the first audio;
- processing the first audio data based at least in part on the time data to generate delayed first audio data, the delayed first audio data having a temporal delay with respect to the first audio data in accordance with the time data;
- processing the delayed first audio data and the second audio data to remove at least a portion of the first audio data from the second audio data to generate third audio data;
- determining that the third audio data includes a representation of a wakeword; and
- sending, to a service-provider system, the third audio data.

6. The computer-implemented method of claim 5, further comprising:
- prior to processing the second audio data, receiving, from the first device, an indication that the second audio data includes a representation of speech.

7. The computer-implemented method of claim 5, wherein processing the first audio data using the time data further comprises:
- determining a time delay between sending, to the first device, and receiving, at the first device, the first audio data.

8. The computer-implemented method of claim 5, wherein processing the second audio data comprises at least one of:
- performing acoustic echo cancellation using the first audio data; and
- performing acoustic echo suppression using a result of the acoustic echo cancellation.

9. The computer-implemented method of claim 5, further comprising:
- receiving, from a computer memory, state information corresponding to the first device; and
- determining, using the state information, a computing-resource allocation corresponding to the first device, the computing-resource allocation including a wakeword-detection component and an acoustic-echo cancellation component.

10. The computer-implemented method of claim 9 further comprising:
- determining that a period of inactivity of the first device satisfies a condition;
- storing, in the computer memory, second state information corresponding to the computing-resource allocation; and
- de-allocating the computing-resource allocation.

11. The computer-implemented method of claim 5, further comprising:
- sending, from a second device to the service-provider system, a user-account registration request;
- receiving, at the second device from the service-provider system, user-account information;
- sending, from the first device to the second device, a notification of activation; and
- sending, from the second device to the first device, the user-account information.

12. The computer-implemented method of claim 5, further comprising:
- receiving, from the first device, a first public encryption key;
- generating, based at least in part on the first public encryption key, encrypted data;
- sending, to the first device, the encrypted data; and
- sending, to the first device, a second public encryption key.

13. A system comprising:
- at least one processor; and
- at least one memory including instructions that, when executed by the at least one processor, cause the system to:
  - send, to a first device, first audio data,
  - cause the first device to output first audio corresponding to the first audio data,
  - receive, from the first device, second audio data, the second audio data including a representation of at least a portion of the first audio,
  - receive from the first device, time data corresponding to a time of output of the first audio,
  - process the first audio data based at least in part on the time data to generate delayed first audio data, the delayed first audio data having a temporal delay with respect to the first audio data in accordance with the time data,
  - process the second audio data and the time data to remove at least a portion of the first audio data from the second audio data to generate third audio data,
  - determine that the third audio data includes a representation of a wakeword, and
  - send, to a service-provider system, the third audio data.

14. The system of claim 13, wherein the at least one memory further includes instructions that, when executed by the at least one processor, further cause the system to:
- prior to processing the second audio data, receive, from the first device, an indication that the second audio data includes a representation of speech.

15. The system of claim 13, wherein the at least one memory further includes instructions that, when executed by the at least one processor, further cause the system to:
- determine a time delay between sending, to the first device, and receiving, at the first device, the first audio data.

16. The system of claim 13, wherein the at least one memory further includes instructions that, when executed by the at least one processor, further cause the system to:
- perform acoustic echo cancellation using the first audio data; and
- perform acoustic echo suppression using a result of the acoustic echo cancellation.

17. The system of claim 13, wherein the at least one memory further includes instructions that, when executed by the at least one processor, further cause the system to:
- receive, from the at least one memory, state information corresponding to the first device; and determining, using the state information, a computing-resource allocation corresponding to the first device, the computing-resource allocation including a wake-word-detection component and an acoustic-echo cancellation component.

18. The system of claim 17, wherein the at least one memory further includes instructions that, when executed by the at least one processor, further cause the system to:
   determine that a period of inactivity of the first device satisfies a condition;
   store, in the at least one memory, second state information corresponding to the computing-resource allocation; and
   de-allocate the computing-resource allocation.

19. The system of claim 13, wherein the at least one memory further includes instructions that, when executed by the at least one processor, further cause the system to:
   send, from a second device to the service-provider system, a user-account registration request;
   receive, at the second device from the service-provider system, user-account information;
   send, from the first device to the second device, a notification of activation; and
   send, from the second device to the first device, the user-account information.

20. The system of claim 13, wherein the at least one memory further includes instructions that, when executed by the at least one processor, further cause the system to:
   receive, from the first device, a first public encryption key;
   generate, based at least in part on the first public encryption key, encrypted data;
   send, to the first device, the encrypted data; and
   send, to the first device, a second public encryption key.

* * * * *